United States Patent
Miyamoto

(10) Patent No.: US 6,757,139 B2
(45) Date of Patent: Jun. 29, 2004

(54) INFORMATION RECORDING APPARATUS WITH INERTIA ARM AND SWING REGULATING MECHANISM

(75) Inventor: Makoto Miyamoto, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 237 days.

(21) Appl. No.: 09/973,050

(22) Filed: Oct. 10, 2001

(65) Prior Publication Data

US 2002/0044387 A1 Apr. 18, 2002

(30) Foreign Application Priority Data

Oct. 13, 2000 (JP) .................................... P2000-313237
Sep. 14, 2001 (JP) .................................... P2001-279489

(51) Int. Cl.$^7$ .............................. G11B 21/22; G11B 5/54
(52) U.S. Cl. .................................................. 360/256.4
(58) Field of Search ......................... 360/256.4, 256, 360/256.1, 254, 240, 265.1, 256.2, 265.7, 266

(56) References Cited

U.S. PATENT DOCUMENTS 5,528,437 A * 6/1996 Mastache ................. 360/256.4
5,715,119 A * 2/1998 Williams et al. ......... 360/265.1

FOREIGN PATENT DOCUMENTS

| JP | 8-339645 | 12/1996 |
| JP | 9-503608 | 4/1997 |
| JP | 10-302418 | 11/1998 |
| WO | WO 95/12196 | 5/1995 |

* cited by examiner

Primary Examiner—Julie Anne Watko
(74) Attorney, Agent, or Firm—McDermott, Will & Emery

(57) ABSTRACT

In a state wherein an actuator is located at a shunt position, when an apparatus is subjected to an external shock, the actuator tries to swing due to a rotational moment. An inertia arm generates a rotational moment simultaneously with the actuator. Both the rotational moments competes with each other at an engaging point of the inertia arm side with the actuator side to absorb the external shock. Further the actuator tries to excessively swing exceeding the limit of the original swing range during the operation of the apparatus. In order to prevent this, the inertia arm is used.

16 Claims, 13 Drawing Sheets

INFORMATION RECORDING APPARATUS WITH INERTIA ARM AND SWING REGULATING MECHANISM

BACKGROUND OF THE INVENTION

1. Field of the Invention

The present invention relates to an information recording apparatus including an actuator which has a head arm for holding a recording/reproducing head for a recording medium and which loads and unloads the head arm for the recording medium by swinging. More particularly, the present invention relates to an information recording apparatus including a function for preventing the actuator from being swung accidentally toward the recording medium side when the apparatus is subjected to an external shock in a state that the actuator is located at a shunt position.

2. Description of the Related Art

As a shunt position of an actuator at non-operating, a ramp block is arranged on a periphery of a disc. Holding the actuator on the ramp block prevents a slider from moving accidentally to a data area of the disc. This is done to avoid adsorbing the slider onto the disc surface during stoppage or damaging the data area.

It is required that the actuator is held at a shunt position also when the apparatus is subjected to an external shock at non-operating. In particular, in a magnetic disc apparatus carried on a portable personal computer such as a notebook computer, a high reliability to cope with the shock is required at non-operating.

As measures against a shock, it is considered to provide an inertia lever and a latch lever. When the apparatus is subjected to an external shock, the inertia lever is swung by the inertia, the swung inertia lever is engaged with the latch lever, and the latch lever is caused to move to a swing locus of the actuator, thereby latching the actuator by the latch lever. This holds the actuator at a shunt position in spite of the shock. This function is exhibited in a clockwise direction or in a counterclockwise direction.

On the other hand, the actuator may excessively swing in a load direction or in an unload direction exceeding a limit of its original swing range due to some unusual condition such as an abnormal run of a voice coil motor during the operation of the apparatus. At this time, in order to prevent the actuator from hitting a spindle motor or other areas of the apparatus, crush stops are provided. The crush stops has two ones: one in a load direction side; and another in an unload direction side.

In order to restrain the accidental swing of the actuator due to a shock, using two elements of the inertia lever and the latch lever causes the reliability of operation to become unstable.

The inertia lever has a lager mass than that of the latch lever, so that the inertia lever, when subjected to a shock, swings earlier than the latch lever. The latch lever having a smaller mass swings later.

There is a time difference in the start of swing between both levers as described above, and the actuator is not engaged with the latch lever in a stationary state at the shunt position. This brings about a possibility that the latch operation of the actuator by the latch lever fails. In particular, when the actuator hits the crush stops, thus causing a rebound thereof, there becomes higher a possibility that the latch operation fails.

The fact that the latch mechanism consists of two elements of the inertia lever and the latch lever to cause the each structure to become complex, and that two crush stops are required, as a whole, leads to an increased structural complex and an increased cost.

Although the above-mentioned problems are associated with a magnetic disc apparatus, the problems can be addressed by applying them not only to a case where the recording medium is a magnetic disc, but also widely to general information recording apparatuses.

SUMMARY OF THE INVENTION

Therefore, an object of the present invention is to provide an information recording apparatus wherein an actuator can securely be held at a shunt position against an external shock.

Another object of the present invention is provide an information recording apparatus which can prevent the actuator from swinging excessively due to some unusual conditions such as an abnormal run of a voice coil motor.

A further object of the present invention is to provide an information recording apparatus wherein the number of parts is reduced to thereby achieve a slim shape.

Other objects, features and advantages of the present invention will appear in the description thereof which follows.

The actuator has a head arm for holding a recording/reproducing head for a recording medium, and loads and unloads the head arm for the recording medium by swinging. The information recording apparatus includes an inertia arm for restraining the swing of the actuator when the apparatus is subjected to an external shock. Here, the loading means moving of the head (slider) from the shunt position of the actuator to a position opposed to the data area of the recording medium, while the unloading means moving of the head from the position opposed to the data area to the shunt position. The swingable pivotally supported actuator generates a rotational moment when subjected to an external shock, while the inertia arm also generates a rotational moment in the same direction. The present invention restrains the swing of the actuator, when the actuator is located at least in the shunt position, by competing a rotational force generated from the actuator due to the external shock with a rotational force generated from the inertia arm, in spite of the above-mentioned shock.

A shock transmitting portion is provided on the actuator while a shock transmitting portion is also provided on the inertia arm. The transmitting portion on the actuator side and that on the inertia arm side are in a state in which they are dynamically interlocked with each other in a form of engagement or abutment with the actuator located at the shunt position.

The direction of the rotational moment of the actuator is the same as that of the inertia arm. The moving direction of the shock transmitting portion on the actuator side and that on the inertia arm side are opposite to each other. In other words, both the transmitting portions are related dynamically to each other such that both the portions are pushed to each other, or pulled from each other so that an action and a reaction work. However, this is a case where a rotational moment generates simultaneously on both the actuator and the inertia arm due to an external shock. Otherwise, when the actuator is driven to swing itself, the inertia arm generates no rotational moment, and however, the above-mentioned action and reaction do not occur on both the transmitting portions, whereby the actuator becomes possible to swing for loading and unloading with respect to the recording medium. As long as a free swing of the actuator is allowed, the relationship between both the transmitting portions is such that they may lose interlocking each other in a load and unload state, or they may interlock with each other on a condition that no substantial action and reaction occur.

Due to an external shock, a rotational moment is generated on the actuator, and the rotational moment in the same rotational direction is also generated on the inertia arm. The actuator tries to swing using the supporting axis of itself as a center with the rotational moment while the inertia arm also tries to swing using the supporting axis of itself as a center with the rotational moment.

As a result of such a trend of the swing of both the actuator and the inertia arm, the shock transmitting portion on the actuator side and that on the inertia arm side exert a rotational force on each other. The action and reaction causes the rotational forces by the both to be competed with each other.

The competing with each other causes an effect due to an external shock to be reduced. This is a function of absorbing a shock.

Therefore, when an external shock is exerted, substantially at the moment, that is, without delay in response, the function of absorbing a shock works by the above-mentioned competing with each other in rotational force. This makes it possible to prevent the actuator located at the shunt position from being swung accidentally to the recording medium side. The function absorbs a shock by instantaneously competing with each other in rotational force without delay in response, thereby allowing a positive motion without failure.

In addition to the function of absorbing a shock as described above, the crush stops is reduced with respect to preventing the actuator from excessively swinging exceeding the limit of the original swing range due to some unusual conditions such as an abnormal run of a voice coil motor.

The excessive swing of the actuator includes an aspect which excessively swings along the unloading direction from the data area of the recording medium, an aspect which excessively swings along the loading direction from the data area. This concludes, as a broader concept, that the head is swung outside the data area and further swung in a direction away from the data area. A structure for restraining the excessive swing does not use specially other members, but utilizes the inertia arm itself provided for the above-mentioned shock absorbing function.

In the actuator, a rotational force transmitting portion is provided for transmitting an excessive swing rotational force of the actuator to the inertia arm. In the inertia arm, a rotational force receiving portion is provided for receiving the rotational force from the rotational force transmitting portion on the actuator side. In addition, a swing regulating portion is provided for regulating the swing exceeding a predetermined extent of the inertia arm subjected to a rotational force at the rotational force receiving portion. The swing regulating portion can be constituted so as to share with a part of the actuator or can be constituted of a fixed portion such as an enclosure of the information recording apparatus. The sharing of the inertia arm with a part of the actuator allows the crush stops to be reduced.

When the function of restraining an excessive swing exceeding the limit of the original swing range is constituted so as to work in the unload direction of the actuator, the crush stops in the unload direction can be reduced. When it is constituted so as to function in the load direction, the crush stops in the load direction can be reduced. When it is constituted so as to function in both of the unload direction and the load direction, the two crush stops in both of the unload direction and the load direction can be reduced together.

With respect to the number of parts for the shock absorbing function, as compared to a case where two parts of the inertia lever and latch lever are used, the present invention uses one part of the inertia arm. Although there are two shock transmitting portions, they are integral with the actuator and the inertia arm, respectively. Further, the rotational force transmitting portion is integral with the actuator, while the rotational force receiving portion is integral with the inertia arm. A structure is also possible that the shock transmitting portion is shared with the rotational force transmitting portion or the rotational force receiving portion. In addition, crush stops are reduced. That is, according to the present invention, as a whole, the number of parts can be reduced and the structure can be simplified. It also contributes to making slim of the information recording apparatus. The reduced cost thereof is advantageously developed.

In the invention of the above-mentioned information recording apparatus, a preferred aspect is that the shock transmitting portion on the actuator side is shared with the rotational force transmitting portion on the above-mentioned actuator. Another preferred aspect is that the shock transmitting portion on the inertia arm side is shared with the rotational force receiving portion on the above-mentioned inertia arm. Both the shock transmitting portions exhibit the above-mentioned shock absorbing function by instantaneously competing with each other in rotational force when the actuator is located at the shunt position. The shunt position is located outside the unload direction side of the recording medium. Therefore, when the shock transmitting portions are shared with the rotational force transmitting portion and the rotational force receiving portion, the shock transmitting portions correspond to the excessive swing along the unload direction, and in this case, the crush stops in the unload direction can be reduced. Then, the sharing structure thereof allows the structure to be further simplified.

In the above-mentioned information recording apparatus, a preferred aspect is that the actuator is shared with the swing regulating portion for the above-mentioned inertia arm. When the actuator tries to excessively swing, the rotational force transmitting portion on the above-mentioned actuator side gives a rotational force to the rotational force receiving portion on the inertia arm side, whereby the actuator tries to cause the inertia arm to swing in a direction opposed to the actuator. Although the swing regulating portion regulates the swing of the inertia arm which the actuator tries to do, the actuator is shared with the swing regulating portion. Adjusting the relative positional relationship and the dimensional relationship between the actuator and the inertia arm can cause the actuator to be shared with the swing regulating portion of the inertia arm. In this case, the structure can be further simplified.

In the above-mentioned information recording apparatus, another preferred aspect is that the swing regulating portion for the above-mentioned inertia arm is used as a fixed portion in the enclosure. The fixed portion in the enclosure may be shared with a part of the enclosure itself, or another part such as a pin may be mounted onto the enclosure. In this case, the degree of freedom of design becomes relatively higher.

In the above-mentioned information recording apparatus, a preferred aspect is that the above-mentioned actuator is made a structure in which the mass is balanced as regards the supporting axis, and that the above-mentioned inertia arm is made a structure in which the mass is balanced as regards the supporting axis. A linear acceleration acts on the center of gravity. When the mass is not balanced, and the center of gravity is not coincided with the supporting axis, a linear acceleration acting on the center of gravity causes a rotational moment to be generated. Depending on the direction of the linear acceleration, the correlation between the rotational moment by the angular acceleration on the actuator and the rotational moment by the angular acceleration on the inertia arm is deviated from a predetermined relationship. Then, this causes the above-mentioned shock absorbing function by competing with each other in rotational force to have a trouble.

On the contrary, when the center of gravity is coincided with the supporting axis, no linear acceleration contributes to the rotation. Therefore, this allows the effect of the linear acceleration at shocking to be controlled as small as possible, thereby allowing the shock absorbing function by competing with each other in rotational force to be successfully exhibited satisfactorily.

In the information recording apparatus, a preferred aspect is constituted such that an inertia moment ratio (J1/J2) is substantially equal to an effective radius ratio (R1/R2).

J1 represents the inertia moment of the actuator and J2 the inertia moment of the inertia arm. R1 represents the effective radius of the shock transmitting portion on the actuator side and R2 the effective radius of the shock transmitting portion on the inertia arm side.

This allows the shock absorbing function by competing with each other in rotational force to be made ideal.

In the information recording apparatus, a preferred aspect is constituted such that the shock transmitting portion of the actuator and the shock transmitting portion of the inertia arm are engaged with each other in a state that the actuator is located at the shunt position. Another preferred aspect is constituted such that when the actuator swings in the load direction and reaches a proximate position of the data area of the recording medium, the engagement is released. In this case, a position holding mechanism is further provided for holding a position of the inertia arm at the above-mentioned engagement releasing position.

Just before the actuator becomes a loading state to the recording medium, the engagement of both shock transmitting portions are released. The actuator becomes free from the inertia arm, and thereafter the load of the swing motion of the actuator is reduced, so that a smooth swing motion of the actuator is ensured.

When the releasing is performed, the engagement must be again performed just before returning to the shunt position. The position holding mechanism holds the position of the inertia arm at the engagement releasing position, thereby allowing the re-engagement to be made positive.

In the above-mentioned description, a preferred aspect is that the above-mentioned position holding mechanism consists of an energizing device for energizing the inertia arm in a predetermined rotational direction and a fixed portion for abutting on the inertia arm at the engagement releasing position to regulate the swing. In this case, as the above-mentioned energizing device, a device consisting of a magnet and a magnetic substance for being magnetically attracted to the magnet can be included. In this case, the magnetic substance may be mounted to the inertia arm, or the magnet may be mounted to the inertia arm. Further, as the above-mentioned energizing device, a tension spring extended between the inertia arm and the fixed portion can be included.

With the regulation of the position of energizing and abutting on respect to the inertia arm, the inertia arm can be stably held at the engagement releasing position. Further, the structure thereof can be simplified.

In the above-mentioned description, a preferred aspect is that the shock transmitting portion of the above-mentioned actuator side and the shock transmitting portion of the above-mentioned inertia arm are engaged with each other in an involute form. The involute form is the most excellent for the tooth of a gear. An engagement in the involute form allows the swing of the actuator and the swing of the inertia arm when the actuator is driven, as well as the engagement and disengagement of the both to be made smooth. In addition, it allows the shock absorbing function by instantaneously competing with each other in rotational force to be made positive.

In the information recording apparatus of the present invention, the shock absorbing function by competing with each other in rotational force has been related to the function when the actuator is located at the shunt position. The description has not referred to the shock absorbing function with the actuator in a loading state to the recording medium. In the invention described below, the shock absorbing function is exhibited in loading states including that in which the head is opposite to the recording medium.

That is, in order to restrain an accidental swing of the actuator when an external shock acts on the information recording apparatus, instead of the inertia arm, there is provided an inertia substance. The inertia substance is pivotally supported revolvably and interlocked at all times with the swing in the load and unload directions of the actuator.

The inertia substance interlocked to the actuator at all times is characterized in that it exhibits the shock-absorbing function by competing with each other in rotational force in states including not only that in which the actuator is located at the shunt position, but also a loading state in which the head is opposite to the recording medium. The aspects of the interlocking at all times include abutting, contacting, meshing, link connecting and the like.

In the case of the invention previously described, the shock absorbing function by competing with each other in rotational force is made worked only at the shunt position of the actuator. In a loading state in which the head is located on the recording medium, the relationship between the actuator and the inertia arm is made released and the actuator is made swung freely independently of the inertia arm.

In this case, during the operation of the apparatus, when subjected to an external shock in a loading state in which the head is located on the recording medium, the shock causes the head arm to be vibrated on the recording medium. The floating properties of the slider for the recording medium are deteriorated. As a result a hit (that the slider hits a micro projection on the recording medium) and a crush (that a recording layer of the recording medium is subjected to a damage) can occur.

Then, it is necessary to regulate excessive swings of the actuator due to some unusual condition such as an abnormal run of a voice coil motor when the actuator is in a loading state. The excessive swings of the actuator cause the head to be moved outside the data area, and further moved in a direction away from the data area. For this a revolution regulating portion is provided for regulating the revolution range of the inertia substance.

In this case, regardless of the loading state or unloading state of the actuator, a rotational moment in the same direction acts always on both the actuator and the inertia substance for an external shock. As a result rotational forces on both the interlocking portions always compete with each other and the external force is absorbed.

Therefore, when the actuator stays at the shunt position, an accidental swing in the load direction of the actuator can be prevented. Also when the actuator is in a loading state, competing with each other in rotational force at all times on the interlocking portions absorbs the shock against the external shock. This allows the floating properties of the slider to be prevented from being deteriorated, with a result that a damage to the recording medium can be avoided.

In addition, the revolution range of the inertia substance is regulated with a revolution regulating portion for the inertia substance to cope with the excessive moving of the actuator in the load and unload directions. The revolving position of the actuator in the load direction and/or unload direction can be regulated. The crush stop in the load direction and/or the unload direction can be reduced.

In the information recording apparatus having the revolution regulating portion for the inertia substance, a preferred aspect is that the inertia substance is constituted of a disc-shaped frictional resistance substance. Another preferred aspect is that fixed to the actuator is a disc-shaped frictional resistance substance using the supporting axis as a center, and these two frictional resistance substances are constituted such that they abut on each other at all times to absorb the shock by frictional force.

The shock absorbing function by instantaneously competing with each other in rotational force is realized effectively with the frictional resistance.

Further, another preferred aspect is that the inertia substance is constituted of a gear, another gear is fixed to actuator using the supporting axis as a center, and these two gears are constituted such that they mesh with each other at all times to absorb the shock by frictional force. The shock-absorbing function by competing with each other in rotational force is realized effectively with the mesh of gears with each other.

In the above-mentioned description, a preferred aspect is that the revolution regulating portion for the above-mentioned inertia substance is a fixed portion in the enclosure, and a notch portion engaging with the fixed portion is formed on the peripheral surface of the inertia substance.

Although the above-mentioned fixed portion includes a pin-shaped one, compared to the pin, the notch portion is relatively displaceable and, however, when the end edge of the notch portion abuts on the pin, a further revolving of the inertia substance is regulated.

The above-mentioned inertia substance is preferably mass balanced as regards the supporting axis thereof. The substance having the notch portion is also preferably mass balanced. This allows an effect of a linear acceleration on the rotation to be avoided, and the shock absorbing function by competing with each other in rotational force at all times to be successfully exhibited satisfactorily.

Further, in the information recording apparatus having the inertia substance, a preferred aspect is constituted such that the inertia moment ratio (J1/J2) is substantially equal to the effective radius ratio (R1/R2). This allows the shock absorbing function by competing with each other in rotational force at all times to be made ideal.

The invention of the information recording apparatus having the above-mentioned inertia substance may include an aspect which has the inertia substance, and however, omits the revolution regulating portion for the inertia substance. The principal object is not only to exhibit the shock absorbing function by competing with each other in rotational force at all times, that is, the shunt position, but also to exhibit the shock absorbing function by competing with each other in rotational force even in loading state. In this case, it does not matter whether the crush stop is provided or not, and thus the crush stop may be provided without omitting it, and even when omitting it, means corresponding to the crush stop may be separately provided.

In the present invention on the above-mentioned information recording apparatus, it does not matter whether a specific aspect of the recording medium is considered or not, and thus a disc-shaped recording medium may be intended, or a card-shaped recording medium may be intended. However, the present invention preferably intends for the disc-shaped recording medium.

Further, although the present invention intends for an information recording apparatus, it does not matter whether a specific aspect of the information recording apparatus is considered or not, and thus a magnetic recording apparatus, a magneto-optic recording apparatus or an optical recording apparatus may be appropriate. However, the present invention preferably intends for the magnetic disc apparatus. In this case, a head for the above-mentioned recording/reproducing is a magnetic head.

BRIEF DESCRIPTION OF THE DRAWINGS

These and other objects, advantages, features and uses of the invention will become more apparent from the following description of preferred embodiments of the invention with reference to the accompanying drawings wherein.

In all these figures, like components are indicated by the same numerals.

DETAILED DESCRIPTION OF THE PREFERRED EMBODIMENTS

Preferred embodiments of an information recording apparatus of the present invention are described in detail by way of example in a case of a magnetic disc apparatus.

First Embodiment

A first embodiment of the present invention is characterized in that crash stops in an unload direction are made unnecessary.

Figure 1:
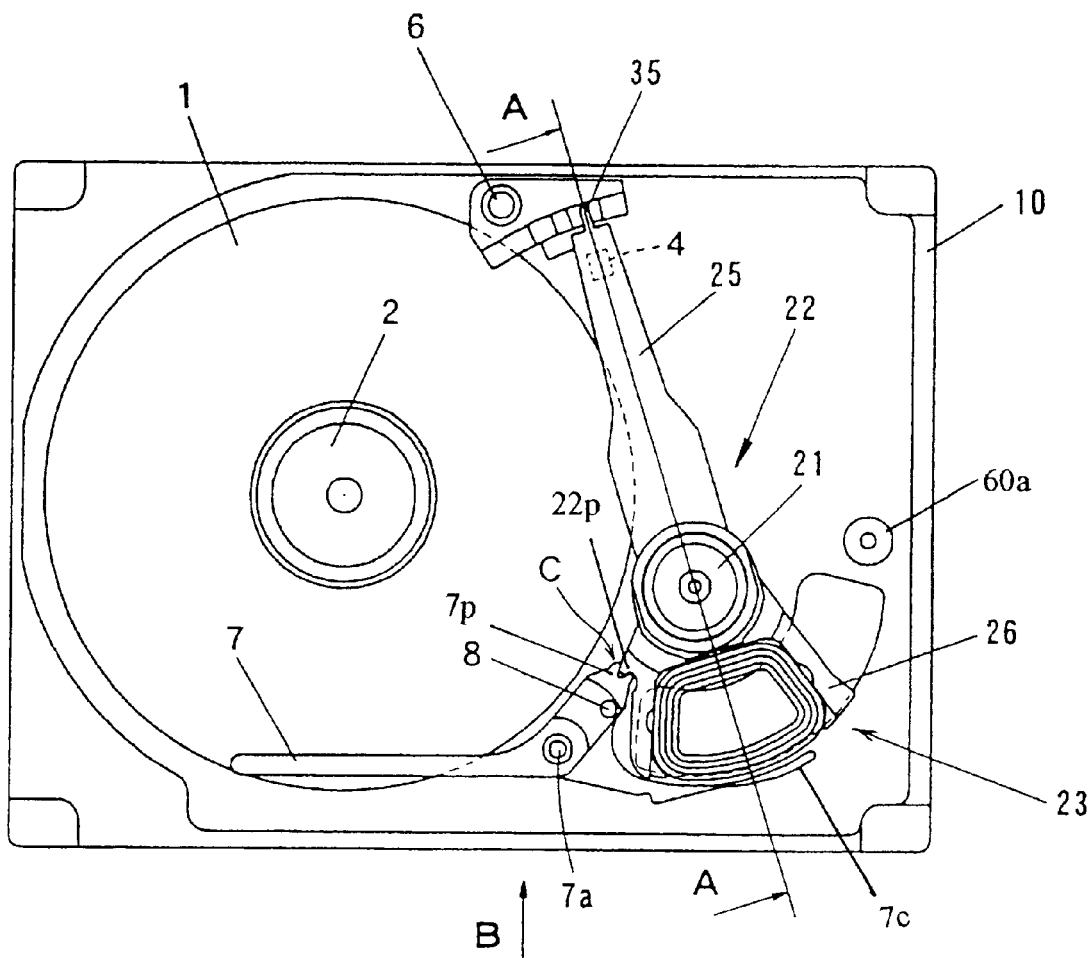
FIG. 1 is a plan view showing a schematic structure of a magnetic disc apparatus according to a first embodiment of the present invention.
Figure 2:
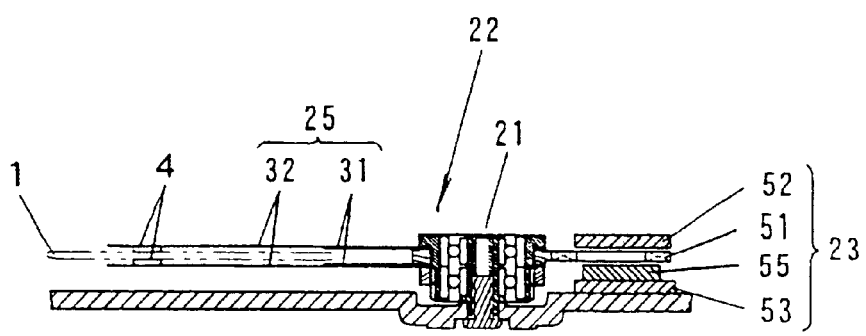
FIG. 2 is a sectional view taken along a line A—A according to FIG. 1 of the first embodiment.

FIG. 1 shows a state in which an upper cover is removed and a yoke is omitted. This magnetic disc apparatus has an enclosure 10.

A magnetic disc 1, a spindle motor 2, an actuator 22, a voice coil motor 23 for driving the actuator 22, a ramp block 6, and an inertia arm 7 having a latch function of the actuator 22 are housed inside the enclosure 10.

The actuator 22 is provided with a slider 4. The ramp block 6 is provided at a shunt position of the actuator 22.

This magnetic disc apparatus unloads the actuator 22 to the shunt position at operation stopping, and holds the actuator 22 at the shunt position at non-operating.

The disc 1 is fixed to a rotor of the spindle motor 2. The disc 1 is rotationally driven using a spindle axis of the spindle motor 2 as a center when the apparatus is operated, and stops in rotation (stands still) when the apparatus is not operated. Tracks (not shown) in which data and servo-information are recorded are arranged concentrically on a surface of the disc 1. In this embodiment, although the number of discs 1 to be installed is one, two or three or more discs may be installed.

The actuator 22 has a head arm 25 and a coil arm 26, and is pivotally supported swingably using a supporting axis 21 consisting of a pivot bearing as a center. A pair of the head arm 25 and the coil arm 26 are provided on the both sides of the disc 1. The head arm 25 has a carriage arm 31 and a suspension arm 32 suspended from the carriage arm 31. The suspension arm 32 has a tab 35 to be shunted to the ramp block 6. The tab 35 is held by the ramp block 6 when the head arm 25 is moved to the shunt position, and formed with a projection (not shown) contacting with the lamp block 6. A slider 4 is mounted to the suspension arm 32. The slider 4 is mounted to the head arm 25 in a manner to be opposite to a top surface and a bottom surface of the disc 1, and electrically connected to a controller (not shown). The slider 4 includes a head element (not shown) which records data from the above-mentioned controller onto the track on the surface of the disc 1, and reads the data recorded on the track and sends it to the above-mentioned controller.

The voice coil motor 23 constituted by a coil 51 mounted on the inner surface of the coil arm 26, an upper yoke 52 and a lower yoke 53, a permanent magnet 55 provided fixedly on a top surface of the lower yoke 53, and the like. The coil 51 is supplied with a drive current from the controller (not shown). The coil arm 26 is arranged in a space sandwiched between the upper yoke 52 and the lower yoke 53. A part of the coil arm 26 is engaged with the inertia arm 7 described later.

The ramp block 6 has a composite plane (not shown) formed of an inclined plane and a plane corresponding to the tab 35. The composite plane is arranged toward the motional direction of the tab 35 associated with the swing of the suspension arm 32 at unloading, that is, toward radially the outside of the disc 1 to be fixed to the enclosure 10. A load/unload mechanism comprises the actuator 22, the voice coil motor 23 and the ramp block 6.

The actuator 22 is constituted to have the slider 4, the head arm 25 (the carriage arm 31, the suspension arm 32), the coil arm 26 and the coil 51.

Figure 3:
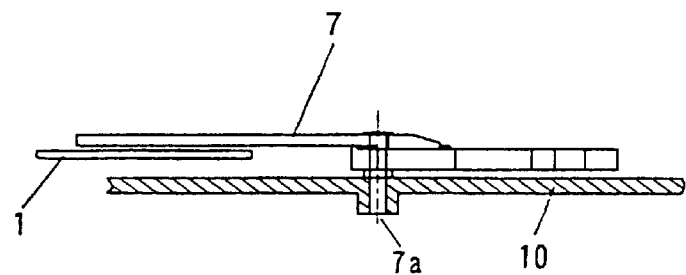
FIG. 3 is an arrow view in a direction of B according to FIG. 1 of the first embodiment.

The inertia arm 7 is swingably supported by the enclosure 10 around a supporting axis 7A (see FIG. 3).

The actuator 22 and the inertia arm 7 are engaged with each other when the actuator 22 is located at the shunt position. What actually engage with each other are a shock transmitting portion 22P on the actuator 22 side and a shock transmitting portion 7P on the inertia arm 7 side. A place where both the shock transmitting portions 22P, 7P are engaged with each other is an engaging point C. The shock transmitting portion 22P on the actuator 22 side is provided on the coil arm 26. In the first embodiment, the engaging of both the shock transmitting portions 22P, 7P is an involute-shaped one generally used for gears in which both the portions engages with each other in meshing state. The inertia arm 7 is fixed with a magnetic substance 8 for being magnetically attracted to a permanent magnet 55 on the voice coil motor 23 side as an energizing device.

Figure 6:
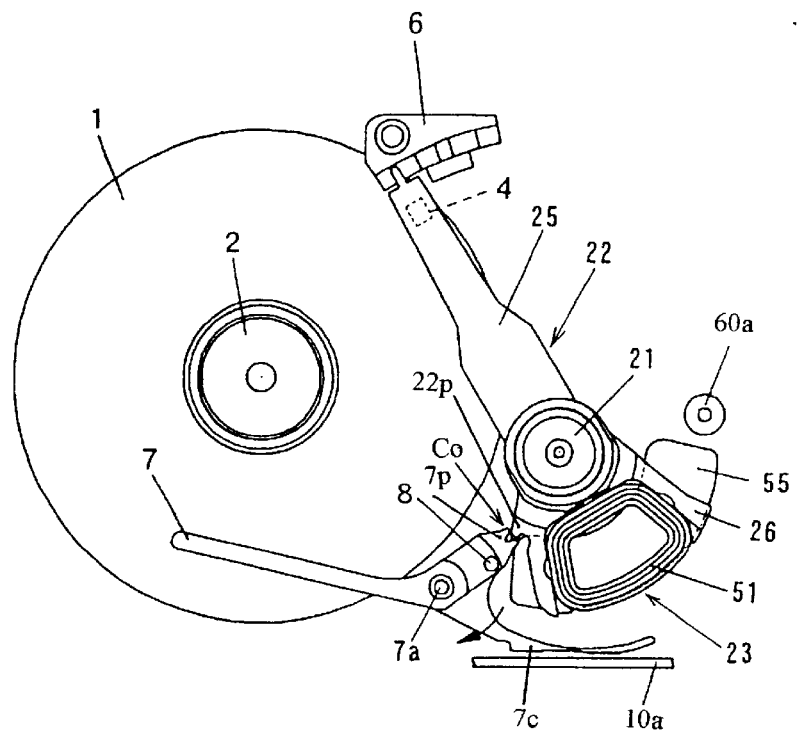
FIG. 6 is a plan view describing the operation of the magnetic disc apparatus of the first embodiment.

FIG. 6 shows a state just before loading in which the actuator 22 swings counterclockwise from the shunt position and reaches a proximate position in data area of the disc 1. At the proximate position, the shock transmitting portion 22P on the actuator 22 side and the shock transmitting portion 7P on the inertia arm 7 side release the engagement of the both. This is an engagement releasing position Co. The inertia arm 7 is constituted such that when it is located at the engagement releasing position Co, a fin-shaped extension 7C being a part thereof abuts on a fixing portion 10A being a part of the enclosure 10. The magnetic attraction force working between the magnetic substance 8 provided on the inertia arm 7 and the permanent magnet 55 on the voice coil motor 23 side causes the inertia arm 7 to be energized clockwise. Further, the extension 7C abuts on the fixed portion 10A to be regulated positionally. With the energization and positional regulation, the inertia arm 7 is constituted such that it is positionally held at the engagement releasing position Co.

A crush stop 60A is fixed to the enclosure 10 at the right of the actuator 22. The crush stop 60A is generally made of an elastic substance. The crush stop 60A is intended so that when the voice coil motor 23 abnormally runs during operation, the coil arm 26 abuts on the crush stop 60A to regulate the swing range of the actuator 22, thereby avoiding hitting to the spindle motor 2 (see FIG. 7).

Hereinafter, from a point of dynamic view, there will be described on an operation that when the magnetic disc apparatus is subjected to an external shock, with the shock absorbing by competing with each other in rotational force, the actuator 22 is positionally held at the shunt position.

Figure 4:
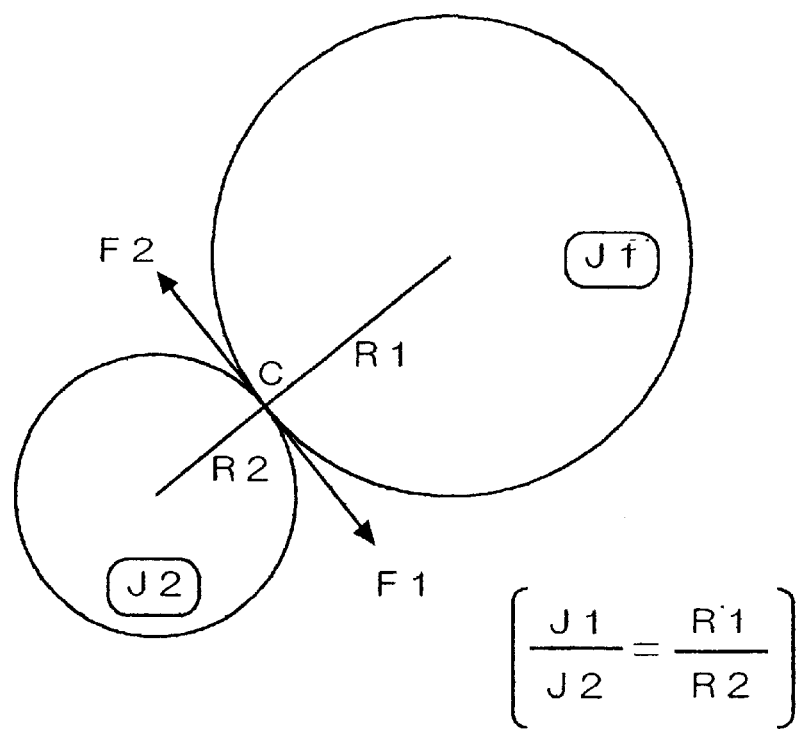
FIG. 4 is a typical view showing a dynamic relationship between an actuator and an inertia arm of the first embodiment.

FIG. 4 shows a dynamic relationship between the actuator 22 and inertia arm 7 engaged with each other at both the shock transmitting portions 22P, 7P. It will be easily understood that the rotational directions of the both are the same, while at the engaging point C, the rotational directions of the both are opposite to each other.

Here, the following is assumed. An inertia moment of the actuator 22 including both the head arm 25 and the coil arm 26 is J1. An inertia moment of the inertia arm 7 including the extension 7C is J2. The effective radiuses of the moments acting at the engaging point C are R1, R2, respectively. The rotational forces of both the moments acting on the engaging point C is F1, F2, respectively and the generating torques of both the moments are T1, T2, respectively, and the actuator 22 and the inertia arm 7 are subjected to the shock of an external angular acceleration β.

A competing relationship between the rotation of the actuator 22 and the rotation of the inertia arm 7 when they are subjected to the shock can be expressed in the following equations:

A torque T1 in the actuator 22;

$$T1 = F1 \cdot R1 = J1 \cdot \beta \quad (1)$$

A torque T2 in the inertia arm 7;

$$T2 = F2 \cdot R2 = J2 \cdot \beta \quad (2)$$

Determining the rotational force F1 in the shock transmitting portion 22P on the actuator 22 side by modifying the equation (1), the following equation is obtained:

$$F1 = J1 \cdot \beta / R1 \quad (3)$$

Determining the rotational force F2 in the shock transmitting portion 7P on the inertia arm 7 side by modifying the equation (2), the following equation is obtained:

$$F2 = J2 \cdot \beta / R2 \quad (4)$$

Now, setting a condition that both the rotational forces compete with each other, the following equation is obtained:

$$F1 = F2 \quad (5)$$

Inserting equations (3) and (4) into equation (5), the following equation is obtained:

$$J1 \cdot \beta / R1 = J2 \cdot \beta / R2 \quad (6)$$

Modifying the above equation, the following equation is obtained:

$$J1/R1 = J2/R2 \quad (7)$$

or $$J2/J1 = R2/R1 \quad (8)$$

As above the ratio of the inertia moments of the actuator 22 and the inertia arm 7 is set to be equal to the ratio of the effective radiuses of the shock transmitting portion 22P on the actuator side and the shock transmitting portion 7P on the inertia arm side.

For example, the ratio of the effective radiuses is assumed to be R1:R2=1.7:1. Then the ratio of the inertia moments is made equally J1:J2=1.71:1.

In this way, when the magnetic disc apparatus is subjected to an external shock, a rotational moment in the same direction works on both the actuator 22 and the inertia arm 7, whereby the rotational forces F1, F2 are caused to compete with each other at the engaging point C. As a result, both of the actuator 22 and the inertia arm 7 are made immobilized, thereby allowing the actuator 22 to be positionally held at the shunt position. With the above-mentioned shock absorbing function by competing with each other in rotational force, an accidental swing of the actuator 22 can be restrained at the shunt position. The competing with each other is performed instantaneously.

In addition, the actuator 22 is mass balanced with respect to a supporting axis (pivot bearing) 21 being the swing center, and is set so that an effect of the linear acceleration at shocking is controlled as low as possible. Similarly, the inertia arm 7 is also mass balanced with respect to a supporting axis 7A being the swing center, and is set so that an effect of the linear acceleration at shocking is controlled as low as possible.

The operation of the magnetic disc apparatus constituted as described above will be described by using FIGS. 5 to 8.

The above-mentioned controller feeds a drive current to the coil of the voice coil motor 23 to cause the actuator 22 to be unloaded to the shunt position.

Figure 5:
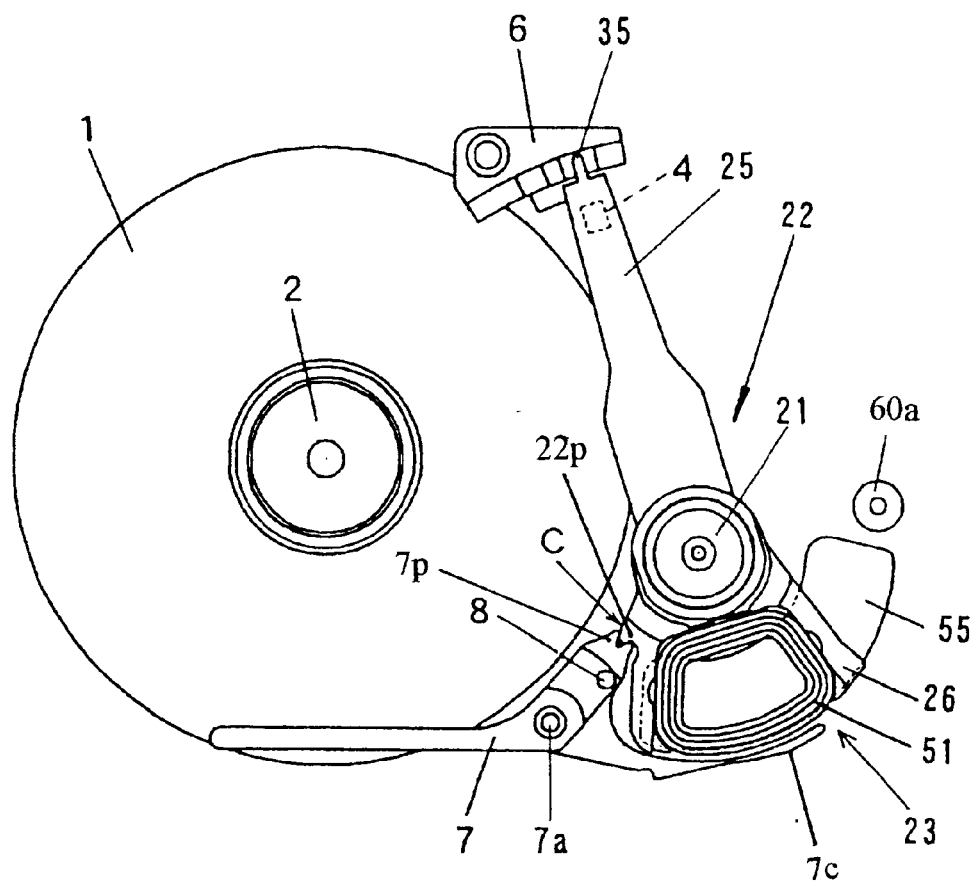
FIG. 5 is a plan view describing an operation of the magnetic disc apparatus of the first embodiment.

FIG. 5 shows a state in which the actuator 22 is unloaded to the shunt position, and the shock transmitting portion 22P on the actuator side and the shock transmitting portion 7P on the inertia arm side engage with each other in an involute form at the engaging point C. When the actuator 22 is located at the shunt position, a tab 35 of the suspension arm 32 is held with the ramp block 6. Further, the disc 1 stands still.

Then, when the operation of the apparatus starts, the actuator 22 is loaded from the shunt position. The slider 4 is moved to the surface of the disc 1 having begun rotational operation, and further the slider 4 is moved onto a required data track on the basis of servo-data having been read by a head element (not shown) of the slider 4.

FIG. 6 shows a state just before the slider 4 approaches the disc 1 (or just after it leaves the disc 1). In FIG. 6, the engagement of the shock transmitting portion 22P on the actuator side with the shock transmitting portion 7P on the inertia arm side has been released. This position is the engagement releasing position Co.

Figure 7:
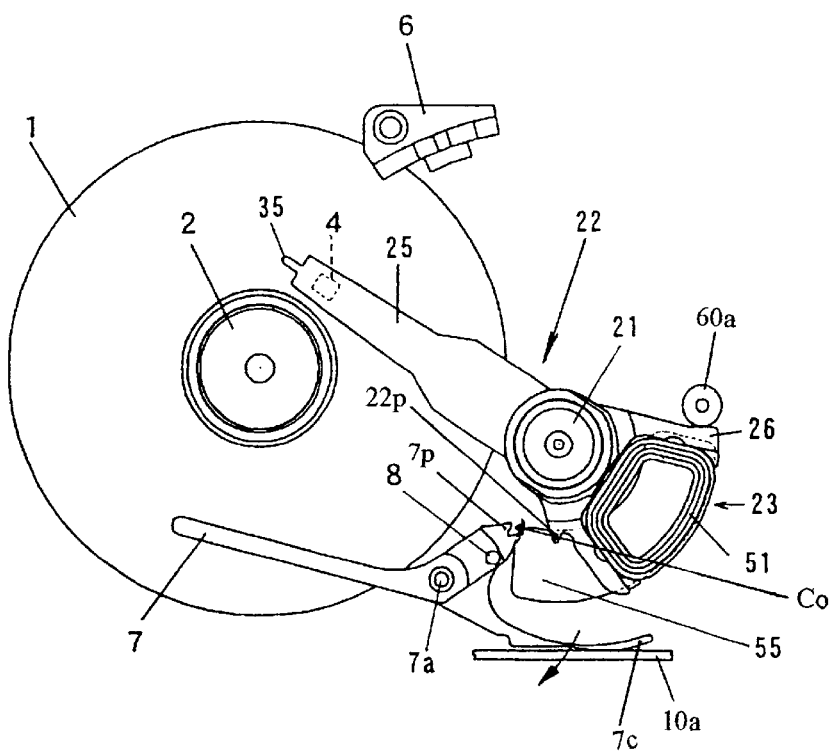
FIG. 7 is a plan view describing the operation of the magnetic disc apparatus of the first embodiment.

FIG. 7 shows a state in which the slider 4 is loaded to the disc 1. Between the state of FIG. 6 and that of FIG. 7, the actuator 22 is left the inertia arm 7 and become free, so that a smooth swing is possible.

When the actuator 22 swings from the shunt position toward the load direction and reaches the engagement releasing position Co shown in FIG. 6, the extension 7C of the inertia arm 7 abuts on the fixing portion 10A of the enclosure 10. The magnetic substance 8 of the inertia arm 7 has been attracted to the permanent magnet 55, so that the shock transmitting portion 7P on the inertia arm 7 side is stably and positionally held at the engagement releasing position Co.

Therefore, when the head arm 25 returns from the state shown in FIG. 7, the shock transmitting portion 7P on the inertia arm side in the positionally holding state receives firmly and accurately the shock transmitting portion 22P on the actuator side. As a result the shock transmitting portion 7P can satisfactorily return to an engaging state.

Then, using FIG. 5, there will be described the operation of the actuator 22 and the inertia arm 7 when the magnetic disc apparatus is subjected to an external shock.

In FIG. 5, in a state in which the actuator 22 stays at the shunt position, when the apparatus is subjected to a counterclockwise directional shock, a moment is generated in which the actuator 22 rotates in counterclockwise direction at a predetermined angular acceleration. On the other hand, a similar moment rotating in counterclockwise is also generated on the inertia arm 7. Rotational forces opposed to each other act on the engaging point C. As described by using FIG. 4, the inertia moment and effective radius of the inertia arm 7 are set at predetermined values, that is, J1/J2=R1/R2.

At the engaging point C, the rotational force F1 at the shock transmitting portion 22P on the actuator side and the rotational force F2 at the shock transmitting portion 7P on the inertia arm side become equal to each other. Thus restrain the operation thereof each other at the engaging point C. The shock absorbing function by instantaneously competing with each other in rotational force works. As a result, an accidental swing of the actuator 22 can be highly-accurately and stably restrained at the engaging point C. Therefore, there can be restrained a fact that the actuator 22 swings accidentally to cause the head arm 25 to move onto the surface of the disc 1.

Further, as shown in FIG. 5, similarly, when the apparatus is subjected to a clockwise directional shock in a state in which the actuator 22 stays at the shunt position, clockwise directional moments are produced at a predetermined angular acceleration on the actuator 22 and the inertia arm 7. The moments become rotational forces opposed in direction to each other at the engaging point C. At the engaging point C, the rotational force at the shock transmitting portion 22P on the actuator side and the rotational force at the shock transmitting portion 7P on the inertia arm side are equal to each other. As a result they restrain the operation thereof each other at the engaging point C. That is, a rebound can be restrained, and also the slider 4 can be prevented from moving to the surface of the disc 1.

Further, as shown in FIG. 7, the actuator 22 excessively swings in a load direction due to some unusual condition such as an abnormal run of the voice coil motor. As a result the coil arm 26 of the actuator 22 abuts on the crush stop 60A to be positionally regulated, thereby preventing the actuator 22 from hitting the spindle motor 2. On the load direction side, the crush stop 60A is required.

Figure 8:
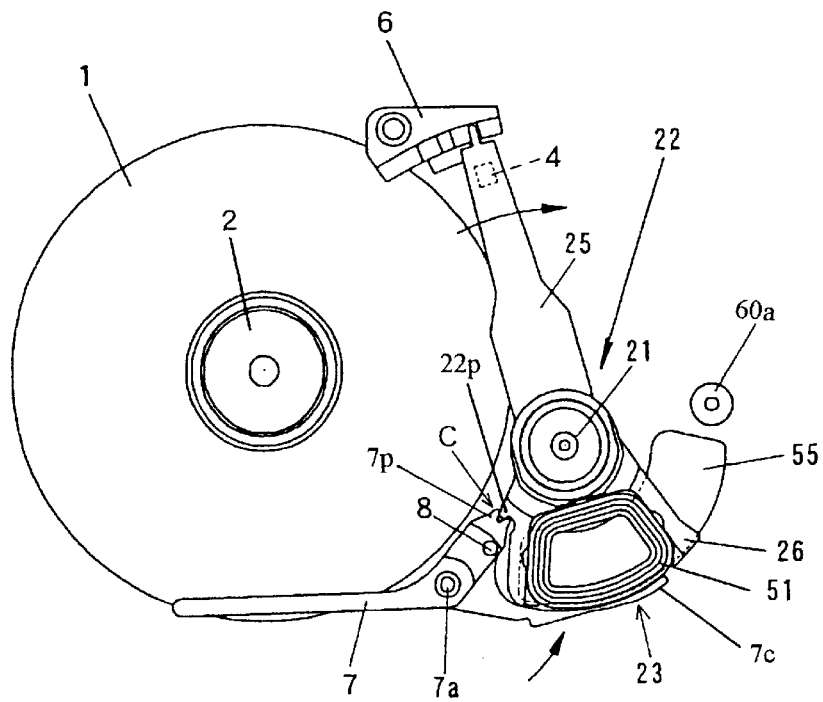
FIG. 8 is a plan view describing the operation of the magnetic disc apparatus of the first embodiment.

FIG. 8 shows a state in which the actuator 22 tries to further swing from a state in which it is unloaded to the shunt position (FIG. 5) to the clockwise direction.

At the time when the slider 4 leaves the disc 1, there is no servo-data (positional information), so that also for this excessive unload operation, generally a crush stop becomes necessary to regulate mechanically the swing range.

In FIG. 8, at the time when the actuator 22 swings excessively in the clockwise direction, the engagement of the shock transmitting portion 22P on the actuator side with the shock transmitting portion 7P on the inertia arm side is realized.

However, thus the shock transmitting portion 22P on the actuator 22 side pushes upwardly to the left side the shock transmitting portion 7P on the inertia arm 7 side, whereby the inertia arm 7 thus pushed tries to swing counterclockwise oppositely to the actuator 22. Due to the fact that the inertia arm 7 tends to swing in counterclockwise direction, the extension 7C of the inertia arm 7 abuts on the coil arm 26 of the actuator 22. This abutment causes the direction in which the extension 7C pushes the coil arm 26 to become along the radial direction of the actuator 22. The pressing force at this point, as a result, is received by the supporting axis 21 of the actuator 22. In other words, the pressing force does not become an action to swing the actuator 22 in either direction. The action of the pressing force is completed at this point. The inertia arm 7 regulated by the coil arm 26 is regulated to swing, and also the actuator 22 having the shock transmitting portion 22P pressing the extension 7C is regulated to further swing.

That is, the excessive swing of the actuator 22 along the unload direction is restrained by utilizing of the inertia arm 7. As a result, the crush stop in the unload direction can be omitted.

In the first embodiment, a rotational force transmitting portion on the actuator side is shared with the shock transmitting portion 22P on the actuator side. A rotational force receiving portion on the inertia arm side is shared with the shock transmitting portion 7P on the inertia arm side. The mechanism of the abutment of the extension 7C of the inertia arm 7 against the coil arm 26 on the actuator 22 side is "the swinging regulation mechanism" as set forth in claims.

According to the first embodiment as described above, when the actuator 22 stays at the shunt position, even if the apparatus is subjected to an external shock, rotational moments in the same direction work on both the actuator 22 and the inertia arm 7. Thus the operations thereof are restrained each other at the engaging point C where rotational directions thereof become opposite to each other. Therefore, there can be avoided the fact that the slider 4 moves accidentally to the data area of the disc 1.

At the engagement releasing position Co where the engagement with the actuator 22 is released at the time of loading, the position of the inertia arm 7 is held by a position holding mechanism. The position holding mechanism is formed of the magnetic attraction between the magnetic substance 8 and the permanent magnet 55 and the abutment of the extension 7C against the fixed portion 10A. Thus at loading/unloading, the disengaging operation and engaging operation of the actuator 22 and the inertia arm 7 can be firmly realized. In addition, the excessive swing of the actuator 22 in the unload direction is regulated by the abutment of the actuator 22 against the inertia arm 7, whereby the crush stop in the unload direction can be omitted.

The position holding mechanism includes an energizing device. The energizing device performs the magnetic attraction between the permanent magnet 55 and the magnetic substance 8, in stead of the device, for example, the mechanism may be constituted such that the inertia arm 7 is energized by the utilization of an elastic deformation of spring material or resin.

Further, the present invention can be realized even with a CCS (Contact-Start-Stop) system in which the actuator is shunted to the inner peripheral side of the disc.

In addition, the inertia arm 7 and the actuator 22 may be interlocked only by the frictional force of the contacting portions as described later.

Further, if the actuator and the inertia arm have correctly the above-mentioned relationship with respect to the inertia moments and effective radiuses, there may be used a mechanism in which one portion is a link having a slot, and another portion is a pin inserted slidably into the slot.

In this case, the slot and the pin are interconnected to each other at all times. The inertia arm 7 is not involved at all times in the swing of the actuator 22 in the data area of the disc 1, and should carry and hold a smooth swing of the actuator 22.

Since the slot and the pin are always interconnected, there is no trouble with a substantial engagement (insertion in opposite directions) of the actuator 22, when returned from the loading state to the shunt position, with the inertia arm 7.

Second Embodiment

A second embodiment of the present invention is characterized in that crash stops in a load direction is made unnecessary.

Figure 9:
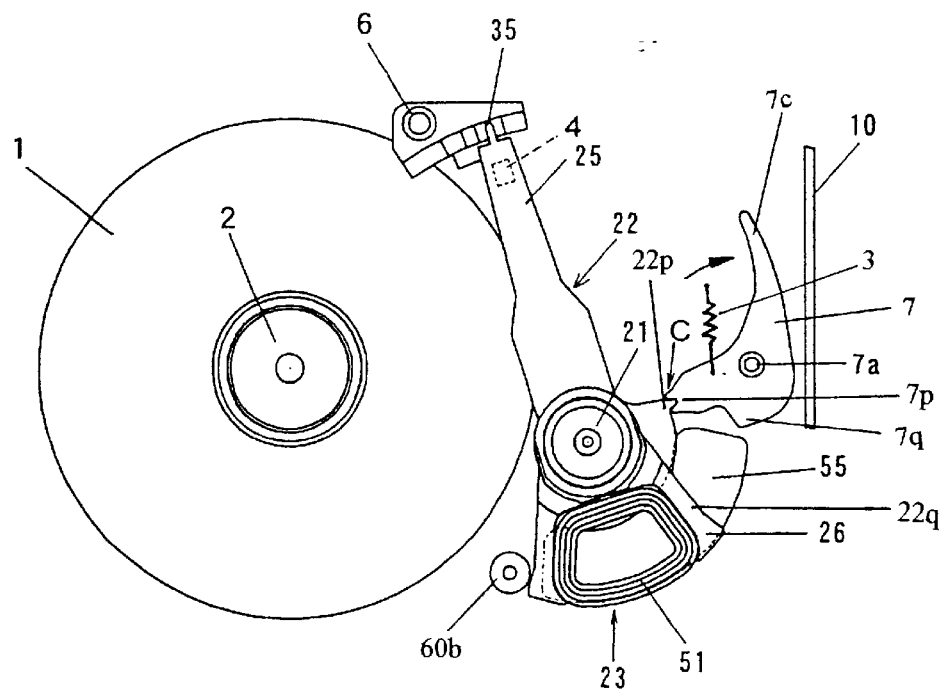
FIG. 9 is a plan view showing a schematic structure of a magnetic disc apparatus according to a second embodiment of the present invention and describing an operation thereof.
Figure 10:
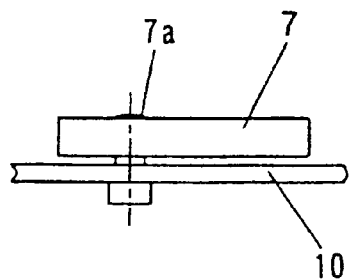
FIG. 10 is a side view of an inertia arm according to FIG. 9 of the second embodiment.

In FIG. 9, the same symbols as in FIG. 1 of the first embodiment indicate same components, so that a detailed explanation will be omitted.

A point different from the structure of FIG. 1 is that FIG. 9 is different in the disposed position of the inertia arm 7 and a crush stop 60B from FIG. 1. The crush stop 60B is disposed at a position at which the coil arm 26 is abutable in order to avoid an excessive swing of the actuator 22 in the unload direction (clockwise). The shock transmitting portion 22P on the actuator 22 side and the shock transmitting portion 7P on the inertia arm 7 side are constituted such that they are engaged with each other in an involute form.

In the actuator 22, a rotational force transmitting portion 22Q is arranged away from the shock transmitting portion 22P. In the inertia arm 7, a rotational force receiving portion 7Q is arranged away from the shock transmitting portion 7P.

The inertia arm 7 is disposed at a position at which the rotational force transmitting portion 22Q abuts on the rotational force receiving portion 7Q on the inertia arm 7 side to cope with an excessive swing of the actuator 22 in the load direction (counterclockwise). The inertia arm 7 is revolvably supported on the enclosure 10 around the supporting axis 7A, and energized at all times in clockwise direction by a tension spring 3 being an example of the energizing device. Other structures are similar to the case of the first embodiment, so that the explanation will be omitted.

The operation of the magnetic disc apparatus constituted as described above will be described below.

FIG. 9 shows a state in which the actuator 22 is unloaded to the shunt position, and the shock transmitting portion 22P on the actuator 22 side and the shock transmitting portion 7P on the inertia arm 7 side are engaged with each other in an involute form. When the actuator 22 is located at the shunt position, the tab 35 of the suspension arm 32 is held by the ramp block 6. Further, the disc 1 stands still.

Then, when the apparatus begins to operate, the actuator 22 is loaded from the shunt position, the slider 4 is moved to the surface of the disc 1 starting rotational operation. The slider 4 is moved onto a required data track on the basis of servo-data read by a head element (not shown) of the slider 4.

Figure 11:
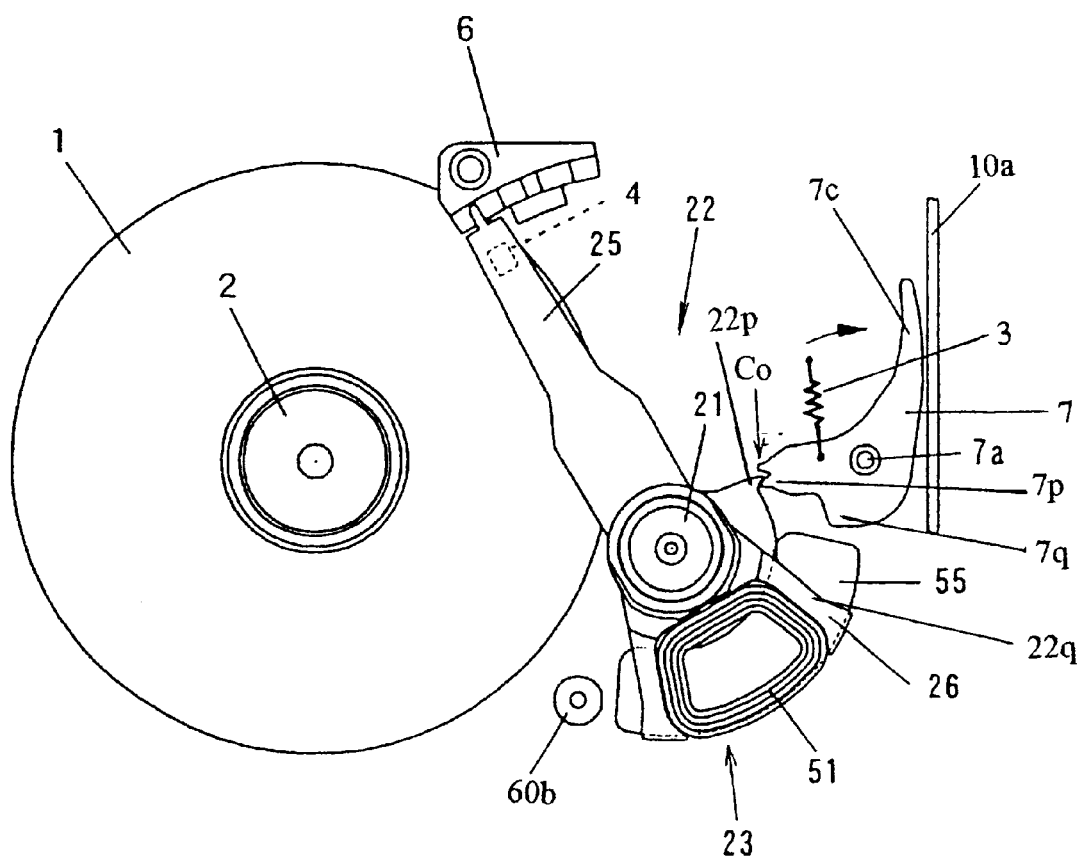
FIG. 11 is a plan view describing the operation of the magnetic disc apparatus of the second embodiment.
Figure 12:
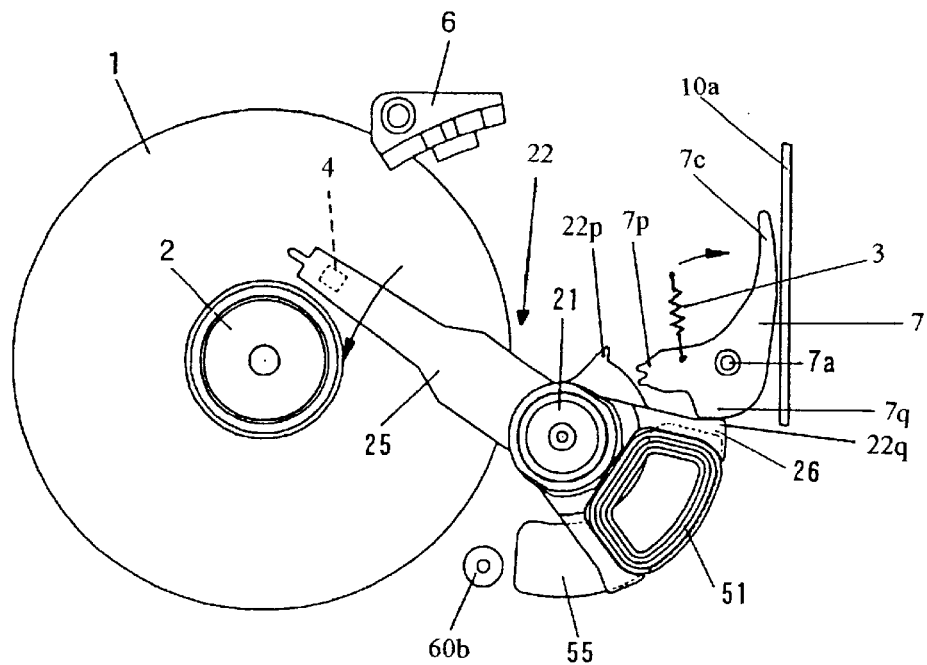
FIG. 12 is a plan view describing the operation of the magnetic disc apparatus of the second embodiment.

FIG. 11 shows a state just before the slider 4 approaches the disc 1 (or just after it leaves the disc 1). In FIG. 11, the engagement of the shock transmitting portion 22P on the actuator 22 side with the shock transmitting portion 7P on the inertia arm 7 side is released. This position is the engagement releasing position Co. FIG. 12 shows a state in which the slider 4 is loaded to the disc 1. Between the state of FIG. 11 and the state of FIG. 12, the actuator 22 is left the inertia arm 7 and become free, so that a smooth swing is possible.

When the actuator 22 swings from the shunt position toward the load direction and reaches the engagement releasing position Co shown in FIG. 11, the extension 7C of the inertia arm 7 abuts on the fixed portion 10A of the enclosure 10. The extension 7C of the inertia arm 7 is pulled by the tension spring 3, so that the shock transmitting portion 7P on the inertia arm 7 side is stably and positionally held at the engagement releasing position Co.

Therefore, when the head arm 25 returns from the state of FIG. 12, the shock transmitting portion 7P on the inertia arm side in the positionally holding state receives firmly and accurately the shock transmitting portion 22P on the actuator side. As a result the shock transmitting portion 7P can return to an engaging state.

Then, using FIG. 9, there will be given a description of the operation of the actuator 22 and the inertia arm 7 when the magnetic disc apparatus is subjected to an external shock.

In FIG. 9, in a state in which the actuator 22 stays at the shunt position, when the apparatus is subjected to a counterclockwise directional shock, a moment is generated in which the actuator rotates in counterclockwise direction at a predetermined angular acceleration. On the other hand, generated also on the inertia arm 7 is a similar moment rotating in a counterclockwise direction. Rotational forces opposed to each other act on the engaging point C. As described using FIG. 4, the inertia moment and effective radius of the inertia arm 7 are set at predetermined values, that is, J1/J2=R1/R2.

At the engaging point C, the rotational force F1 at the shock transmitting portion 22P on the actuator side and the rotational force F2 at the shock transmitting portion 7P on the inertia arm side become equal to each other. Thus the rotational forces F1 and F2 restrain the operation thereof each other at the engaging point C. The shock absorbing function by instantaneously competing with each other in rotational force works. As a result, an accidental swing of the actuator 22 can be highly-accurately and stably restrained at the engaging point C. Therefore, there can be restrained a fact that the actuator 22 swings accidentally by the shock to cause the head arm 25 to move onto the surface of the disc 1.

Also in FIG. 9, similarly, when the apparatus is subjected to a clockwise directional shock in a state in which the actuator stays at the shunt position, clockwise directional moments are produced at a predetermined angular acceleration on the actuator 22 and the inertia arm 7. These moments become rotational forces opposed in direction to each other at the engaging point C. At the engaging point C, the rotational force at the shock transmitting portion 22P on the actuator side and the rotational force at the shock transmitting portion 7P on the inertia arm side are equal to each other. As a result they restrain the operation thereof each other at the engaging point C.

That is, a rebound can be restrained, and the slider 4 can be prevented from moving to the surface of the disc 1.

Further, as shown in FIG. 9, the actuator 22 excessively swings in a load direction due to some unusual conditions such as an abnormal run of the voice coil motor, so that the coil arm 26 of the actuator 22 abuts on the crush stop 60A to be positionally regulated. On the unload direction side, the crush stop 60A is required.

FIG. 12 shows a state in which the actuator 22 is swung from a state in which it is unloaded to the shunt position (FIG. 9) to the counterclockwise direction further.

As described above, for the unload operation, the crush stop 60B is disposed, while at the time when the slider 4 leaves the disc 1, there is no servo-data (positional information), so that for the load operation, generally a crush stop also becomes necessary to mechanically regulate the swing range.

In FIG. 12, when the actuator 22 swings excessively in the counterclockwise direction, the rotational force transmitting portion 22q on the actuator side pushes in the clockwise direction the rotational force transmitting portion 7q on the inertia arm side. Thus the inertia arm 7 tries to swing in the clockwise direction opposite to the actuator 22. Due to the fact that the inertia arm 7 tends to swing in the clockwise direction, the extension 7C of the inertia arm 7 abuts on the fixed portion 10A of the enclosure 10. The inertia arm 7 regulated by the fixed portion 10A is regulated to swing, and the actuator 22 having the rotational force transmitting portion 7Q is also regulated to further swing.

Namely, the excessive swing of the actuator 22 along the load direction is restrained by utilizing of the inertia arm 7. As a result, the crush stop in the load direction can be omitted.

In the second embodiment, a rotational force transmitting portion on the actuator side 22q is provided separately from the shock transmitting portion 22P on the actuator side. A rotational force receiving portion on the inertia arm side 7q is provided separately from the shock transmitting portion 7P on the inertia arm side. The mechanism of the abutment of the extension 7C of the inertia arm 7 against the fixed portion 10A on the actuator side is the swing regulating mechanism.

According to the second embodiment as described above, when the actuator 22 stays at the shunt position, even if the apparatus is subjected to an external shock, rotational moments in the same direction work on the actuator 22 and the inertia arm 7. Thus the operations thereof are restrained each other at the engaging point C where rotational directions thereof become opposite to each other. Therefore, there can be avoided that the slider 4 moves accidentally to the data area of the disc 1.

Further, at the engagement releasing position Co where the engagement with the actuator 22 is released at loading, a position of the inertia arm is held by a position holding mechanism. The position holding mechanism is formed of the energization by the tension spring 3 and of the abutment of the extension 7C against the fixed portion 10A. Thus at the time of loading/unloading, the disengaging operation and engaging operation of the actuator 22 and the inertia arm 7 can be firmly realized. In addition, the excessive swing of the actuator 22 in the load direction is regulated with the abutment of the actuator 22 against the inertia arm 7. As a result the crush stop in the load direction can be omitted.

Third Embodiment

A third embodiment of the present invention is characterized in that both the crash stops in a load direction and an unload direction are made unnecessary as a modification of the first embodiment.

Figure 13:
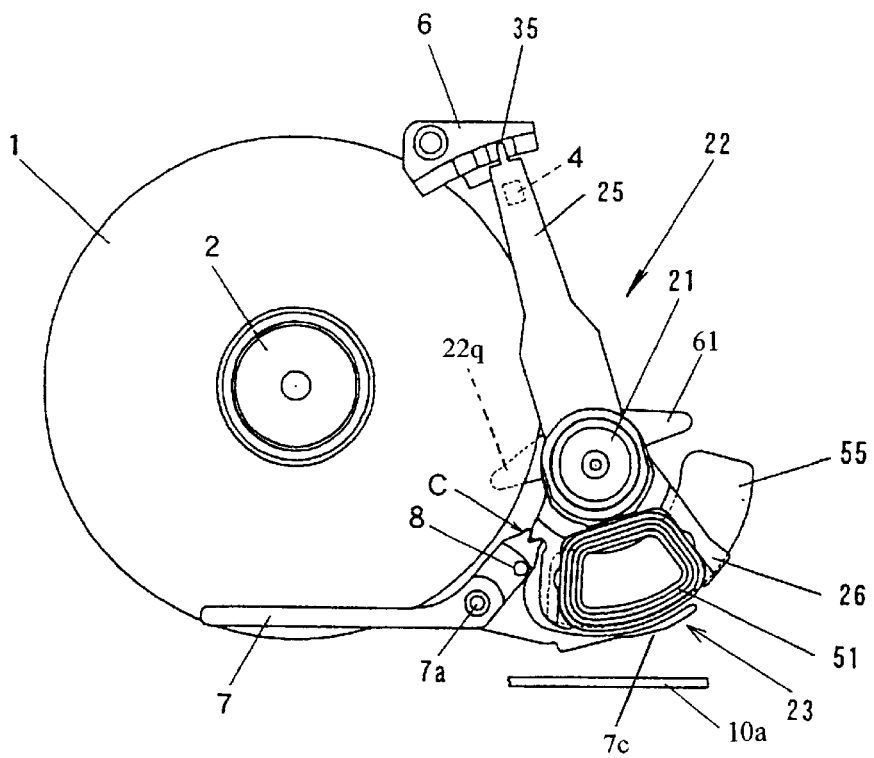
FIG. 13 is a plan view showing a schematic structure of a magnetic disc apparatus according to a third embodiment of the present invention and describing an operation thereof.
Figure 14:
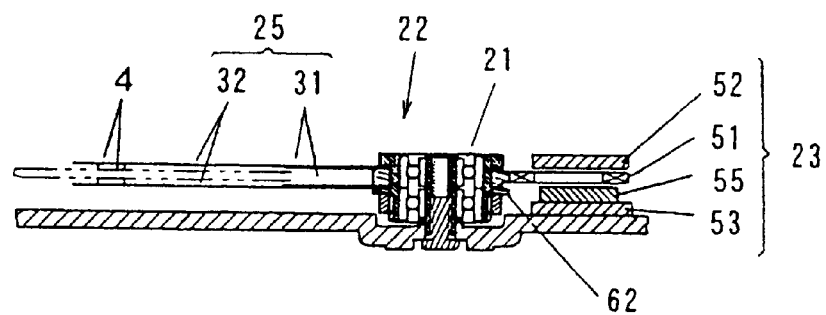
FIG. 14 is a sectional view of an actuator according to FIG. 13 of the third embodiment.

In FIG. 13, the same symbols as shown in FIG. 1 of the first embodiment indicate like components, so that a detailed description will be omitted.

A point different from the structure of FIG. 1 is that an abutment member 61 is fixed to the actuator 22. The abutment member 61 is substantially in the same position as the inertia arm 7 with respect to the height, and has a shape abutable on the inertia arm 7. The head portion of the abutment member 61 becomes the rotational force transmitting portion 22Q in the actuator 22. A portion on the inertia arm 7 side abutable on the rotational force transmitting portion 22Q becomes the rotational force receiving portion 7Q. Further, the abutment member 61 has a symmetrical shape with respect to the center line along the longitudinal direction of the actuator 22, thereby assuring the operational stability of the actuator 22 around the supporting axis 21. Other structures are similar to the case of the first embodiment, so that the description will be omitted.

The operation of the magnetic disc apparatus constituted as described above will be described below.

The controller, when the magnetic disc apparatus stops the operation, feeds a drive current to the coil 51 of the voice coil motor 23, thereby unloading the head arm 25 of the actuator 22 to the shunt position.

The shock absorbing function by instantaneously competing with each other in rotational force when the apparatus is subjected to an external shock in a state of FIG. 13 is similar to the case of the first embodiment, so that the description thereof will be omitted.

Figure 15:
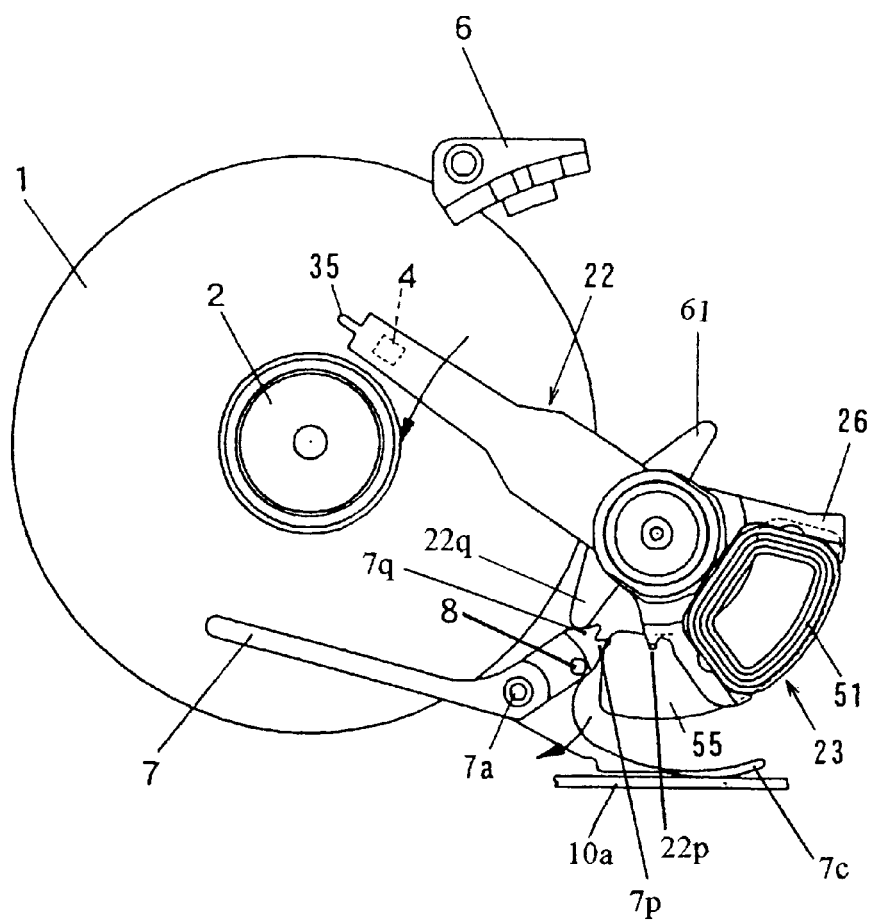
FIG. 15 is a plan view describing the operation of the magnetic disc apparatus of the third embodiment.

FIG. 15 shows a loaded state. When the actuator 22 further excessively swings in the counterclockwise direction from the state shown in FIG. 15, the rotational force transmitting portion 22q on the actuator side abuts on and pushes in the clockwise direction the rotational force transmitting portion 7q on the inertia arm side. Thus the inertia arm 7 tries to swing in the clockwise direction opposite to the actuator 22. Due to that the inertia arm 7 tends to swing in the clockwise direction, the extension 7C of the inertia arm 7 abuts on the fixed portion 10A of the enclosure 10. The inertia arm 7 regulated in swing by the fixed portion 10A does not swing, and also the actuator 22 having the rotational force transmitting portion 7Q is regulated to further swing.

That is, the excessive swing of the actuator 22 along the load direction is restrained by utilizing of the inertia arm 7. As a result, the crush stop in the load direction can be omitted.

Figure 16:
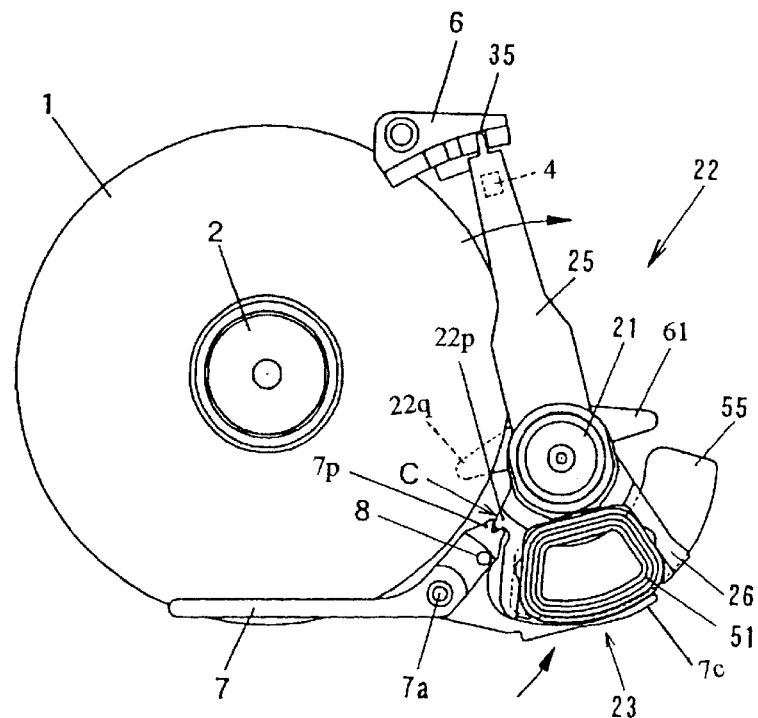
FIG. 16 is a plan view describing the operation of the magnetic disc apparatus of the third embodiment.

FIG. 16 shows a state in which the actuator 22 is moved from a state of being unloaded to the shunt position (FIG. 13) and further moved in the clockwise direction.

In FIG. 16, at the time when the actuator 22 excessively swings in the clockwise direction, the engagement of the shock transmitting portion 22P on the actuator side with the shock transmitting portion 7P on the inertia arm side are realized. However, thus the shock transmitting portion 22P on the actuator 22 side pushes upwardly to the left side the shock transmitting portion 7P on the inertia arm 7 side, whereby the inertia arm 7 thus pushed tries to swing in the counterclockwise direction opposite to the actuator 22. Due to that the inertia arm 7 tends to swing in the counterclockwise direction, the extension 7C of the inertia arm 7 abuts on the coil arm 26 of the actuator 22. This abutment causes the direction in which the extension 7C pushes the coil arm 26 to become along the radial direction of the actuator 22. The pressing force at this point, as a result, is received by the supporting axis 21 of the actuator 22. In other words, the pressing force does not become an action to swing the actuator 22 in either direction. The action of the pressing force is completed at this point. The inertia arm 7 regulated in swing by the coil arm 26 does not swing, and the actuator 22 having the shock transmitting portion 22P pressing the extension 7C is also regulated to further swing.

That is, the excessive swing of the actuator 22 along the unload direction is restrained by utilizing of the inertia arm 7. As a result, the crush stop in the unload direction can be omitted.

According to the third embodiment described above, in addition to the shock absorbing function by instantaneously competing with each other in rotational force, the actuator 22 abuts on the inertia arm 7 and the excessive swing of the actuator 22 in the load direction and the unload direction is regulated. As a result the crush stops in the load and unload directions can be omitted.

In this case, while the abutment member 61 of the third embodiment is independently constituted as a component of the actuator 22, the abutment member 61 may be integrally constituted with a component of the actuator 22, for example, the coil arm 26.

Fourth Embodiment

A fourth embodiment of the present invention is characterized in that both the crash stops in a load direction and an unload direction are made unnecessary as a modification of the second embodiment.

Figure 17:
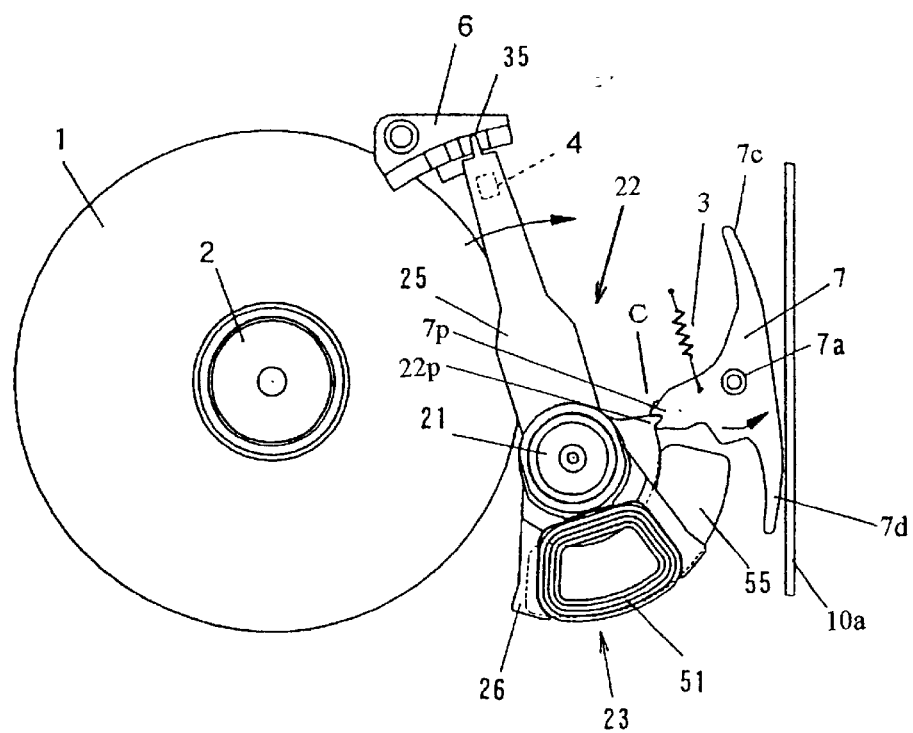
FIG. 17 is a plan view describing an operation of the magnetic disc apparatus of a fourth embodiment.

In FIG. 17, the same symbols as in FIG. 9 of the second embodiment indicate like components, so that a detailed description will be omitted.

A point different from the structure of FIG. 9 is that the inertia arm 7 has the shock transmitting portion 7P and the extension 7C, and in addition, another substantially symmetric extension 7D.

The shock absorbing function by competing with each other in rotational force when the apparatus is subjected to an external shock is similar to the case of the second embodiment, so that the description will be omitted.

Figure 18:
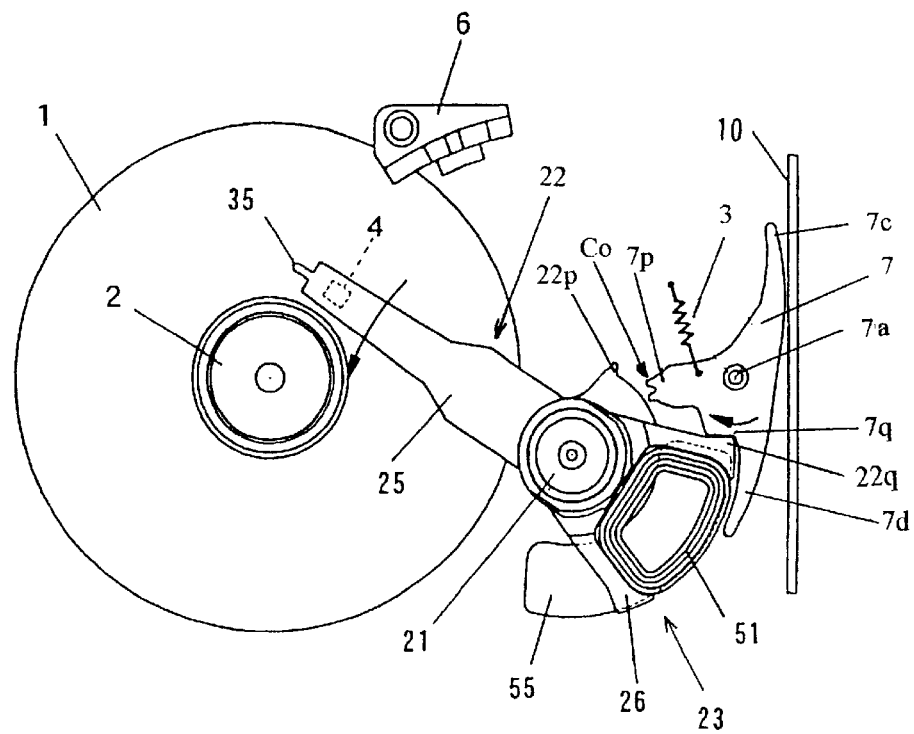
FIG. 18 is a plan view describing the operation of the magnetic disc apparatus of the fourth embodiment.

FIG. 18 is substantially the same as FIG. 12, and shows that to cope with the excessive swing of the actuator 22 in the load direction, the crush stop in the load direction can be omitted.

FIG. 17 shows that to cope with the excessive swing of the actuator 22 in the unload direction, the crush stop in the unload direction can be omitted.

In FIG. 17, when the actuator 22 excessively swings in the clockwise direction, the rotational force transmitting portion 22q on the actuator side pushes in the clockwise direction the rotational force receiving portion 7q on the inertia arm side. Thus the inertia arm 7 tries to swing in the counterclockwise direction opposite to the actuator 22. Due to that the inertia arm 7 tends to swing in the counterclockwise direction, the second extension 7D of the inertia arm 7 abuts on the fixed portion 10A of the enclosure 10. The inertia arm 7 regulated in swing by the fixed portion 10A does not swing, and also the actuator 22 having the rotational force transmitting portion 22Q pressing the rotational force receiving portion 7Q is further regulated to swing.

That is, the excessive swing of the actuator 22 along the unload direction is restrained by utilizing of the inertia arm 7. As a result, the crush stop in the unload direction can also be omitted.

A point different from the third embodiment is that the third embodiment uses the abutment member 61, while the fourth embodiment uses the second extension 7D. Other structures and operations are similar to the case of the second embodiment, so that the description will be omitted.

Fifth Embodiment

A fifth embodiment of the present invention is characterized in that even when the actuator operates in the data area of the disc, there is avoided a damage to the disc due to deterioration of slider floating properties.

Figure 19:
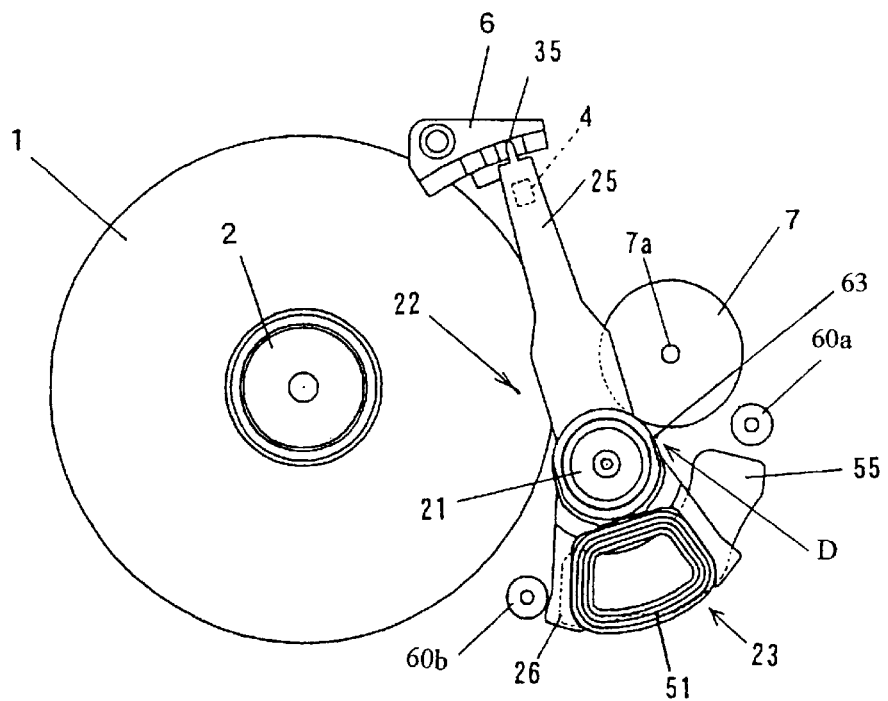
FIG. 19 is a plan view showing a schematic structure of a magnetic disc apparatus according to a fifth embodiment of the present invention and describing an operation thereof.
Figure 20:
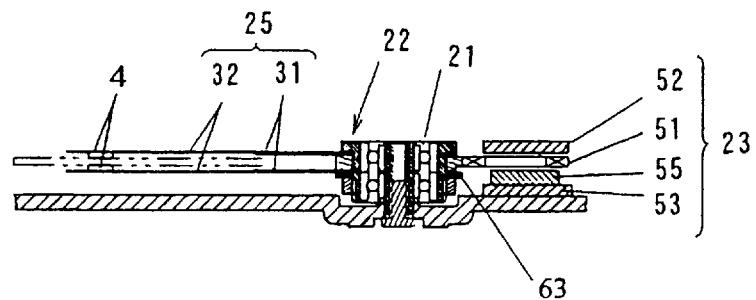
FIG. 20 is a sectional view of an actuator according to FIG. 19 of the fifth embodiment.
Figure 21:
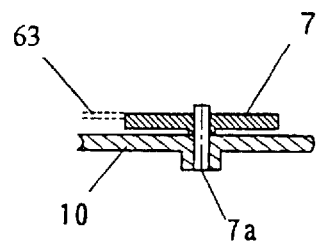
FIG. 21 is a cross-sectional view of an inertia substance of the fifth embodiment.

In FIG. 19 a disc-shaped frictional resistance substance 63 is fixed to the actuator 22 (see FIGS. 20 and 21). An inertia substance 7 rotatably supported on the enclosure 10 around the supporting axis 7A is made engaged with the frictional resistance substance 63 of the actuator 22 at all times regardless of the position of the actuator 22.

The frictional resistance substance 63 is of disc-shape and uses the supporting axis 21 of the actuator 22 as a center, which disc-shaped frictional resistance substance 63 is fixed to the actuator 22. The inertia substance 7 is of disc-shape and uses the supporting axis 7A as a center, which inertia substance 7 is also constituted by a disc-shaped frictional resistance substance. The peripheral surface of the disc-shaped frictional resistance substance 63 and the peripheral surface of the inertia substance 7 constituted by the disc-shaped frictional resistance substance abut on each other at all times. This abutment is intended to transmit a rotational force by friction. The peripheral surface of the frictional resistance substance 63 and the peripheral surface of the inertia substance 7 are constituted by, for example, rubber material in order to enlarge the frictional resistance. This causes the transmission of the rotational force by friction to be made reliable.

Another technique for securely transmitting the rotational force may include the one in which the partial or full outer periphery of the inertia substance 7 is constituted by a gear. The partial or full outer periphery of the frictional resistance substance 63 is constituted by a gear. These gears of both the substances mesh with each other. In this case, the meshing in an involute form is preferable. Or, the meshing by spur gears may also be sufficient.

For the fifth embodiment, the inertia substance 7 is axially symmetrical without irregular-shaped portion on full periphery. In order to cope with an excessive swing of the actuator 22 in the load and unload directions, pair of crush stops 60A, 60B are disposed at a position at which they are abutable on the coil arm 26 of the actuator 22.

The operation of the magnetic disc apparatus constituted as described above will be described below.

Figure 22:
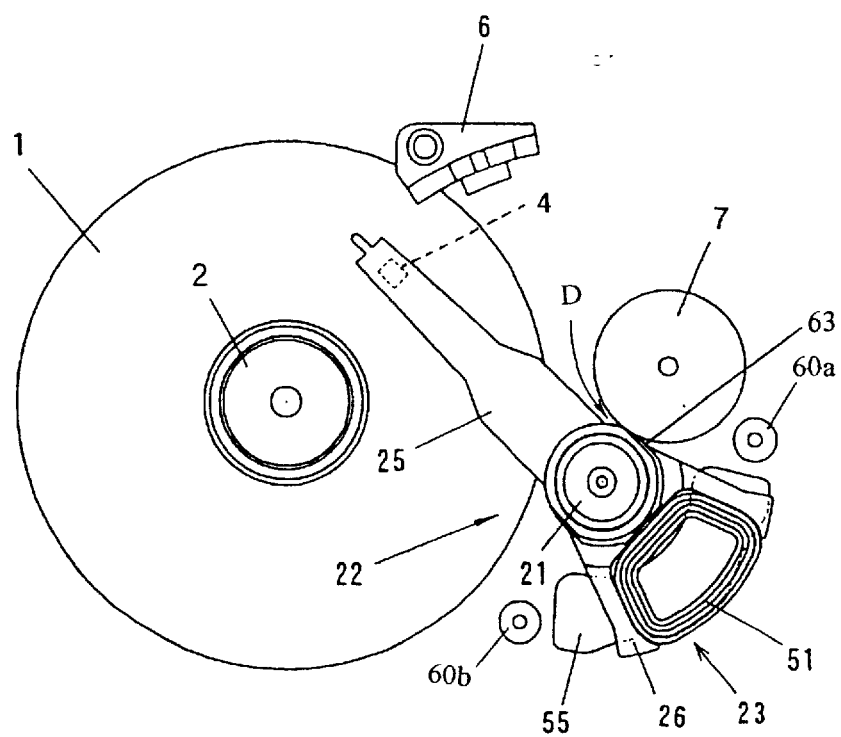
FIG. 22 is a plan view describing an operation of the magnetic disc apparatus of the fifth embodiment.
Figure 23:
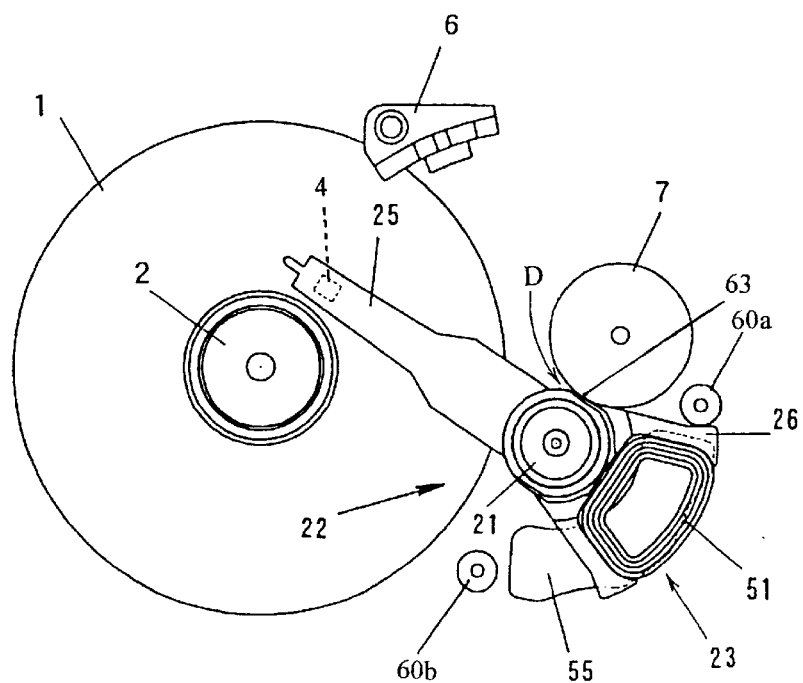
FIG. 23 is a plan view describing the operation of the magnetic disc apparatus of the fifth embodiment.

FIG. 19 shows a state in which the actuator 22 is unladed to the shunt position, while FIGS. 22 and 23 show a state at operating. In either case, the frictional resistance substance 63 and the inertia substance 7 abut on each other at all times, so that a frictional resistance works therebetween. When the actuator 22 is located at the shunt position, the tab 35 of the suspension arm 32 is held by the ramp block 6. Further, the disc 1 stands still.

Then, when the operation of the apparatus starts, the actuator 22 is loaded from the shunt position. The slider 4 is moved to the surface of the disc 1 having begun rotational operation. The slider 4 is further moved onto a required data track on the basis of servo-data having been read by a head element (not shown) of the slider 4.

Then, using FIG. 19, there will be described the operation of the actuator 22 and the inertia arm 7 when the magnetic disc apparatus is subjected to an external shock.

In FIG. 19, in a state in which the actuator 22 stays at the shunt position, when the apparatus is subjected to a counterclockwise directional shock, a moment is generated which rotates in the counterclockwise direction the actuator 22 at a predetermined angular acceleration. On the other hand, generated also on the inertia arm 7 is a similar moment rotating counterclockwise. Therefore, rotational forces opposed to each other act on an abutting point D.

As described using FIG. 4, the inertia moment and effective radius of the inertia arm 7 are set at predetermined values, so that at the abutting point D, the rotational force of the actuator 22 and the rotational force of the inertia arm 7 become equal to each other. Thus restrain the operation thereof each other by the frictional resistance at the abutting point D. In other words, there can be restrained a fact that the actuator 22 swings accidentally by the shock to cause the slider 4 to move onto the surface of the disc 1.

Further in FIG. 19, similarly, when the apparatus is subjected to a clockwise directional shock in a state in which the actuator stays at the shunt position, clockwise directional moments are produced at a predetermined angular acceleration on the actuator 22 and the inertia arm 7. These moments become rotational forces opposed in direction to each other at the abutting point D.

At the abutting point D, the rotational force of the actuator 22 and the rotational force of the inertia arm 7 are equal to each other, so that they restrain the operation thereof each other at abutting point D. Thus, a rebound can be restrained, and the slider 4 can be also prevented from moving to the surface of the disc 1.

Then, using FIG. 22, there will be described the operation of the actuator 22 and the inertia arm 7 when the apparatus is subjected to an external shock.

In FIG. 22, in a state in which the slider 4 is located on the disc 1 at operating, when the apparatus is subjected to a counterclockwise directional shock, a moment is generated which rotates in the counterclockwise direction the actuator 22 at a predetermined angular acceleration. On the other hand, generated also on the inertia arm 7 is a similar moment rotating counterclockwise. Therefore, rotational forces opposed to each other act on the abutting point D. Therefore, at the abutting point D, the rotational force generated on the actuator 22 and the rotational force generated on the inertia arm 7 become equal to each other, and thus restrain the operation thereof each other by the frictional resistance at the abutting point D.

Further, in FIG. 22, in a state in which the slider 4 is located on the disc 1 at operating, when the apparatus is subjected to a clockwise directional shock, similarly the operations thereof are restrained each other by the frictional resistance at the abutting point D.

Therefore, even when the apparatus is subjected to a clockwise or counterclockwise directional shock, the effect of the shock on the slider (head) is restrained. As a result the floating properties of the slider 4 with respect to the disc 1 is kept successfully to allow the damage to the disc 1 to be avoided.

Other structures and operations are similar to the case of the first embodiment, so that the description will be omitted.

The apparatus according to the fifth embodiment is provided with the inertia substance. The inertia substance is rotatably supported and abuts on the actuator 22 to interlock with the operation of the actuator 22. Rotational moments in the same direction always work on both the actuator and the inertia substance against an external shock regardless of the operation or non-operation of the actuator. Thus the shock absorbing function by competing with each other in rotational force is exhibited at the abutting point to cause the operations to be restrained each other.

Therefore, when the actuator stays at the shunt position, there is avoided that the actuator accidentally swings to the data area. When the apparatus is also subjected to an external shock in a state in which the slider 4 is loaded onto the data area of the disc 1, the shock absorbing function by competing with each other in rotational force is exhibited. A damage to the disc due to deteriorated slider floating properties can be avoided.

Sixth Embodiment

A sixth embodiment of the present invention is characterized in that even when the actuator operates in the data area of the disc, the shock absorbing function by competing with each other in rotational force is exhibited. The crush stops in the load and unload directions are unnecessary.

Figure 24:
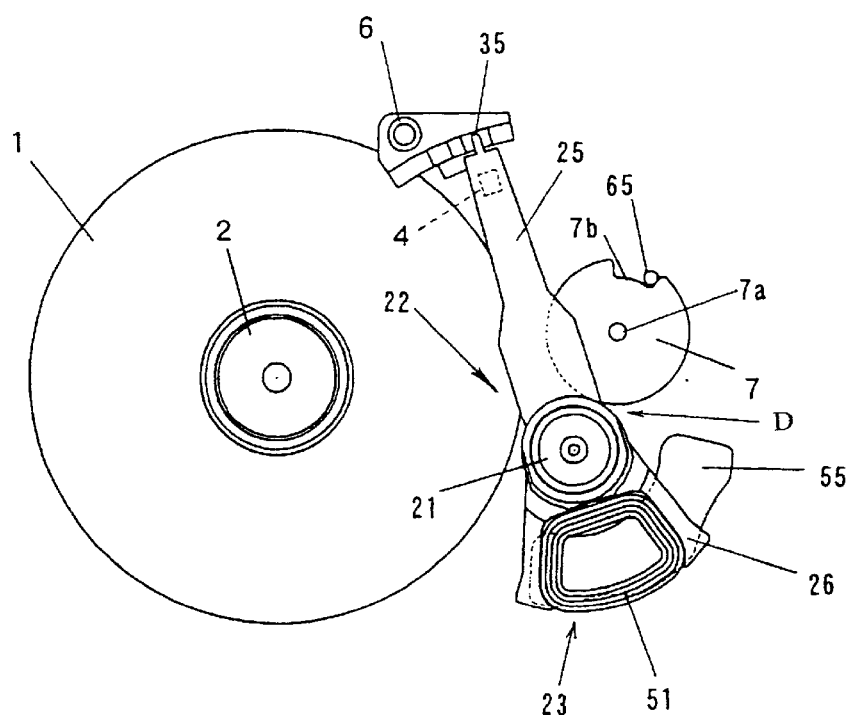
FIG. 24 is a plan view showing a schematic structure of a magnetic disc apparatus according to a sixth embodiment of the present invention and describing an operation thereof.

In FIG. 24, the same symbols as in FIG. 19 of the fifth embodiment indicate like components, so that a detailed description will be omitted.

In the sixth embodiment, the disc-shaped frictional resistance substance 63 is fixed to the actuator 22. The disc-shaped inertia substance 7 which is rotatably supported on the enclosure 10 and formed of a frictional resistance substance abuts on the frictional resistance substance 63 of the actuator 22 at all times regardless of the position of the actuator 22. With the abutment, frictional forces work between the frictional resistance substance 63 and the inertia substance 7, whereby one of the frictional forces is transmitted to the other at all times. The above structure is similar to the case of the fifth embodiment.

In the sixth embodiment, further, a notch portion 7b is provided on the periphery of the inertia substance 7. The enclosure 10 is provided with a pin 65 which engages with the notch portion 7b in a state in which a relative displacement therebetween is allowed within a certain angular range with respect to the notch portion 7b. An end edge of the notch portion 7B abuts on the pin 65 as the inertia substance 7 rotates, so that the inertia substance 7 is regulated to swing further, thereby leading to the regulation of the excessive swing of the actuator 22. The swing range of the actuator 22 from the shunt position of the actuator 22 to the limit position on the innermost diameter side in the data area of the disc 1 corresponds to the angular range of the notch portion 7b in the inertia substance 7.

The operation of the magnetic disc apparatus constituted as described above will be described below.

When the actuator 22 is located at the shunt position and the slider 4 is opposite to the disc 1, the shock absorbing function by competing with each other in rotational force when the apparatus is subjected to an external shock is similar to the case of the fifth embodiment. Consequently, the description will be omitted.

Here, mainly, the reduction of the crush stops will be described.

As shown in FIG. 24, when the actuator 22 is located at the shunt position, the phase of the notch portion 7b in the inertia substance 7 is in a state in which one end of the notch portion 7b is close to or abuts on the pin 65.

When the actuator 22 tries to swing excessively further clockwise, the frictional resistance substance 63 also rotate in the clockwise direction, whereby the inertia substance 7 abutting on at all times the frictional resistance substance 63 is caused to rotate in the counterclockwise direction. However, the end edge of the notch portion 7B in the inertia substance 7 abuts on the pin 65 to be regulated positionally, so that the inertia substance 7 is regulated to swing further. Therefore, the swing of the actuator 22 is regulated, whereby the swing of the actuator 22 can be regulated to cope with the excessive operation in the unload direction even without newly providing a crush stop.

Figure 25:
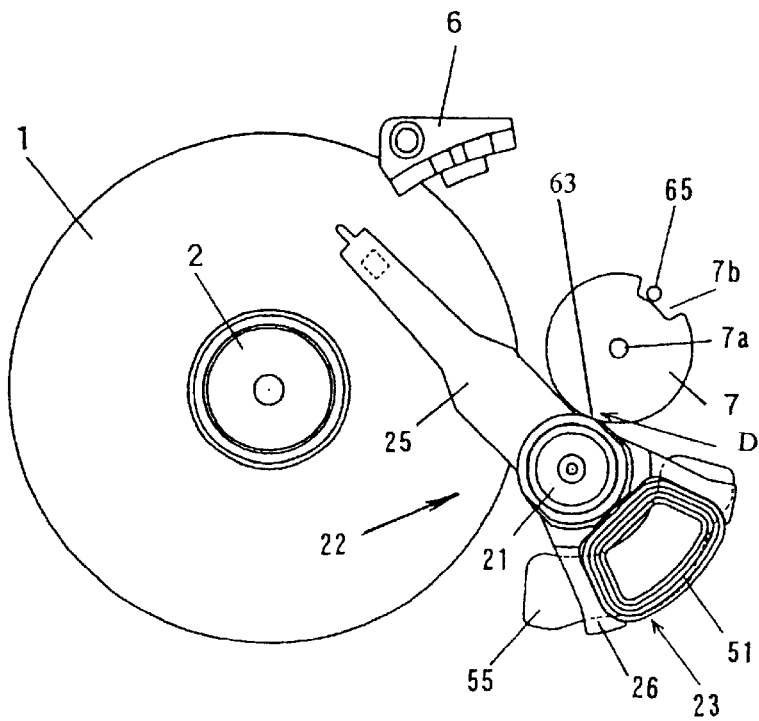
FIG. 25 is a plan view describing the operation of the magnetic disc apparatus of the sixth embodiment.
Figure 26:
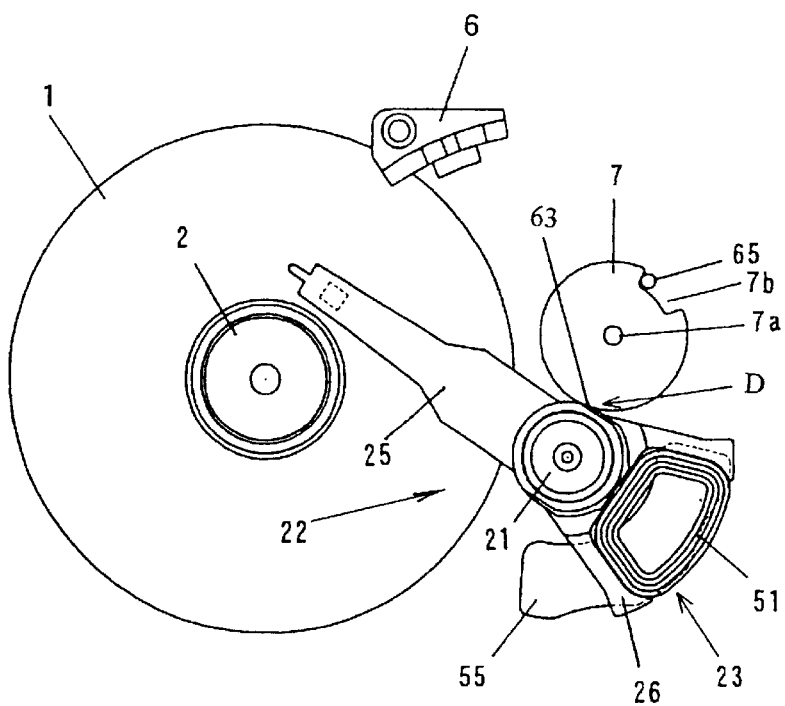
FIG. 26 is a plan view describing the operation of the magnetic disc apparatus of the sixth embodiment.

When the actuator 22 is excessively swung in the counterclockwise direction from the state of FIG. 25 to the state of FIG. 26, the pin 65 abuts on the opposite end of the notch portion 7b in the inertia substance 7. Thus the swing of the inertia substance 7 is regulated. Therefore, the swing of the actuator 22 can be regulated to cope with the excessive operation in the load direction even without specially providing a crush stop.

According to the embodiment as described above, when the inertia substance 7 is used, there can be omitted both the crush stops in the load and unload directions for regulating the excessive swing of the actuator in the load and unload directions.

As described above, the present invention can realize a magnetic disc apparatus having an inertia latch mechanism which is highly reliable and can be installed on a slim disc drive unit, while reducing the number of parts.

While there has been described what is at present considered to be preferred embodiments of the invention, it will be understood that various modifications may be made therein, and it is intended to cover in the appended claims all such modifications as fall within the true spirit and scope of this invention.

What is claimed is:

1. An information recording apparatus comprising:
   an actuator which has a head arm holding a head for recording/reproducing to a recording medium and which loads and unloads said head arm to said recording medium by swinging;
   an inertia arm which is swingably pivotally supported and which generates a rotational moment in the same direction as that of a rotational moment generated by said actuator when subjected to an external shock;
   a shock transmitting portion on said actuator side and a shock transmitting portion on said inertia arm side which operate in such a manner that when said actuator is located at a shunt position, said actuator and said inertia arm transmit shock rotational forces by mutual action/reaction, and the shock rotational force on the actuator side and the shock rotational force on the inertia arm side compete with each other at a point at which the shock rotational forces are transmitted;
   a rotational force transmitting portion on said actuator side and a rotational force receiving portion on said inertia arm side which operate in such a manner that the swing rotational force of the excessive swing of said actuator is transmitted to said inertia arm in order to regulate such an excessive swing of said actuator that said head is moved outside of a data area of said recording medium and further moved in a direction away from said data area, when said actuator is in a state of being loaded to said recording medium; and
   a swing regulating mechanism for regulating the swing exceeding a predetermined extent of said inertia arm which is subjected to the swing rotational force at said rotational force receiving portion.

2. The information recording apparatus according to claim 1, wherein the rotational force transmitting portion on said actuator side and the rotational force receiving portion on said inertia arm side are constituted such that the transmission of the swing rotational force between both the portions is performed to cope with the excessive swing of said actuator in an unload direction.

3. The information recording apparatus according to claim 1, wherein the rotational force transmitting portion on said actuator side and the rotational force receiving portion on said inertia arm side are constituted such that the transmission of the swing rotational force between both the portions is performed to cope with the excessive swing of said actuator in a load direction.

4. The information recording apparatus according to claim 1, wherein the rotational force transmitting portion on said actuator side and the rotational force receiving portion on said inertia arm side are constituted such that the transmission of the swing rotational force between both the portions is performed to cope with the excessive swing of said actuator in an unload direction and in a load direction.

5. The information recording apparatus according to claim 1, wherein the rotational force transmitting portion on said actuator side is shared with the shock transmitting portion on said actuator side while the rotational force receiving portion on said inertia arm side is shared with the shock transmitting portion on said inertia arm side.

6. The information recording apparatus according to claim 1, wherein said swing regulating mechanism for said inertia arm is shared with said actuator.

7. The information recording apparatus according to claim 1, wherein said swing regulating mechanism for said inertia arm is a fixed portion in an enclosure.

8. The information recording apparatus according to claim 1, wherein said actuator is mass balanced with respect to a supporting axis thereof and said inertia arm is mass balanced with respect to the a supporting axis thereof.

9. The information recording apparatus according to claim 1, wherein said actuator and said inertia arm are constituted such that a ratio in inertia moments thereof is substantially equal to a ratio of an effective radius of the shock transmitting portion on said actuator side and an effective radius of the shock transmitting portion on said inertia arm side.

10. The information recording apparatus according to claim 1, wherein the shock transmitting portion on said actuator side and the shock transmitting portion on said inertia arm side are constituted such that they engage with each other in a state in which said actuator is located at a shunt position and that the engagement is released when said actuator swings in a load direction to move to a proximate position in the data area of said recording medium, and are further provided with a position holding mechanism for positionally holding said inertia arm at a position at which said engagement is released.

11. The information recording apparatus according to claim 10, wherein said position holding mechanism comprises:
    an energizing device for energizing said inertia arm in a predetermined rotational direction; and
    a fixed portion for abutting on said inertia arm at said position at which said engagement is released so as to regulate the swing.

12. The information recording apparatus according to claim 11, wherein said energizing device comprises:
    a magnet; and
    a magnetic substance magnetically attracted to the magnet.

13. The information recording apparatus according to claim 11, wherein said energizing device is a tension spring stretched between said inertia arm and the fixed portion.

14. The information recording apparatus according to claim 10, wherein the engagement of the shock transmitting portion on said actuator side with the shock transmitting portion on said inertia arm side is an engagement having an involute-shape.

15. The information recording apparatus according to claim 1, wherein said recording medium is constituted of disc-shape.

16. The information recording apparatus according to claim 1, wherein said head for recording/reproducing is a magnetic head.

* * * * *

UNITED STATES PATENT AND TRADEMARK OFFICE
CERTIFICATE OF CORRECTION

PATENT NO. : 6,757,139 B2  Page 1 of 1
DATED : June 29, 2004
INVENTOR(S) : Makoto Miyamoto It is certified that error appears in the above-identified patent and that said Letters Patent is hereby corrected as shown below:

<u>Column 24,</u>
Line 14, delete the word "the"

Signed and Sealed this

Fourteenth Day of December, 2004

JON W. DUDAS
*Director of the United States Patent and Trademark Office*